United States Patent [19]

Tanabe et al.

[11] Patent Number: 5,436,735
[45] Date of Patent: Jul. 25, 1995

[54] IMAGE FORMING APPARATUS TO ADD ADDITIONAL INFORMATION TO ORIGINAL IMAGE

[75] Inventors: Masatoshi Tanabe, Chigasaaki; Seiya Nishiwaki, Yokohama, both of Japan

[73] Assignee: Canon Kabushiki Kaisha, Tokyo, Japan

[21] Appl. No.: 894,753

[22] Filed: Jun. 5, 1992

[30] Foreign Application Priority Data

Jun. 7, 1991 [JP] Japan .................... 3-162458
Jun. 4, 1992 [JP] Japan .................... 4-168215

[51] Int. Cl.⁶ ............................................ G06F 15/62
[52] U.S. Cl. .................................. 358/453; 358/452
[58] Field of Search ............... 358/443, 448, 452, 453

[56] References Cited

U.S. PATENT DOCUMENTS

| | | |
|---|---|---|
| 4,248,528 | 2/1981 | Sahay . |
| 4,494,862 | 1/1985 | Tanaka . |
| 4,711,553 | 12/1987 | Watanabe . |
| 4,853,878 | 8/1989 | Brown . |
| 4,943,833 | 7/1990 | Fukushima ............ 355/326 |
| 4,963,920 | 10/1990 | Fukushima ............ 355/40 |
| 4,989,042 | 1/1991 | Muramatsu et al. ... 355/244 |
| 4,998,144 | 3/1991 | Karn . |
| 5,187,521 | 2/1993 | Shimizu et al. . |

*Primary Examiner*—Bentsu Ro
*Attorney, Agent, or Firm*—Fitzpatrick, Cella, Harper & Scinto

[57] ABSTRACT

An image processing apparatus includes an exposing lamp to expose an original, and a detector to detect the position and color of marker information marked by a predetermined color on the original which is exposed by the exposing lamp. A first determining circuit determines additional information which is added to the original image in accordance with the color of the marker information detected by the detector, and a second determining circuit determines the recording position of the additional information determined by the first determining circuit in accordance with the position of the marker information detected by the detector. An image forming device for synthesizing the original image and the additional information for recording on the same recording sheet.

25 Claims, 17 Drawing Sheets

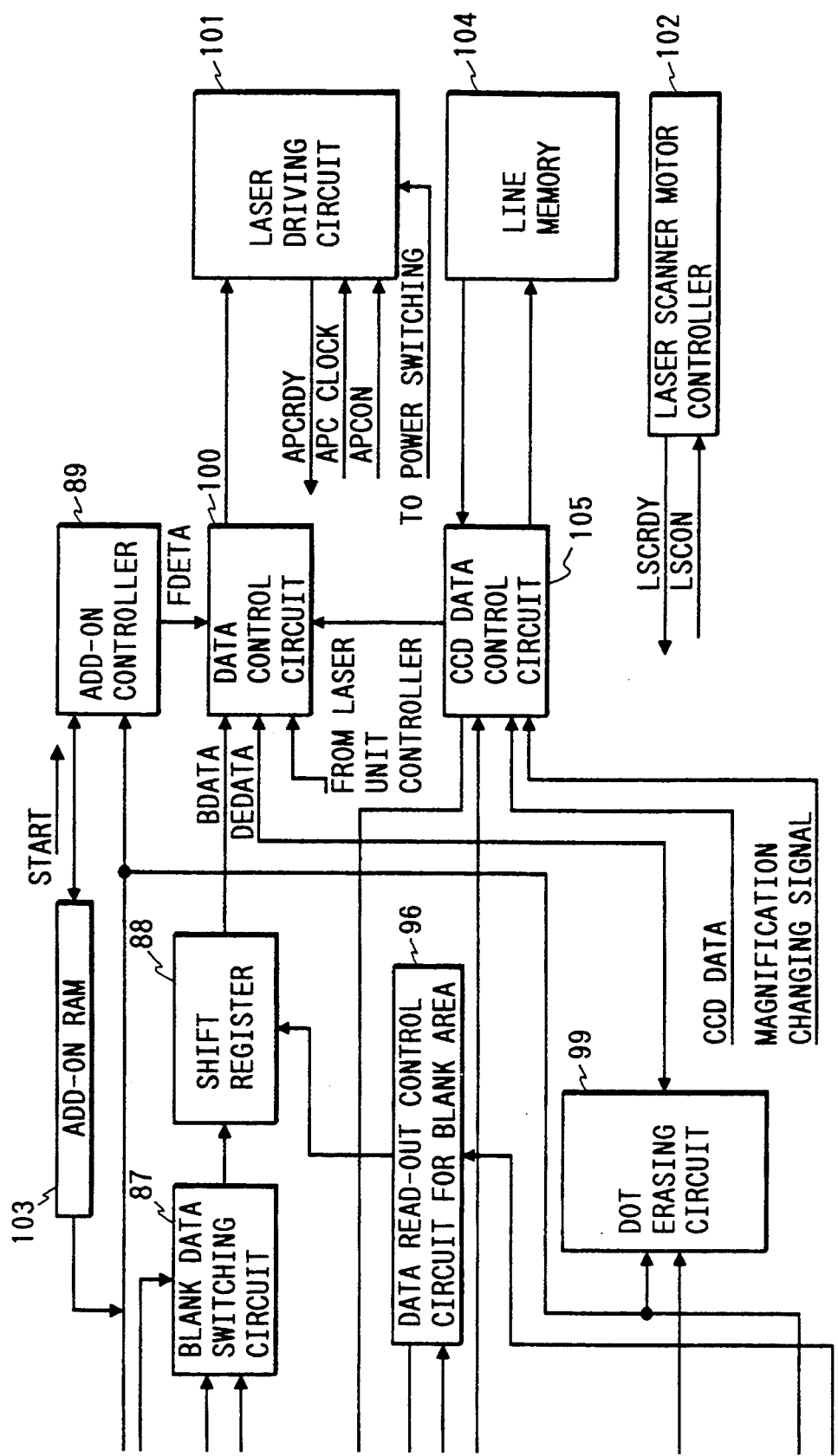

[ORIGINAL]     [COPY IMAGE]

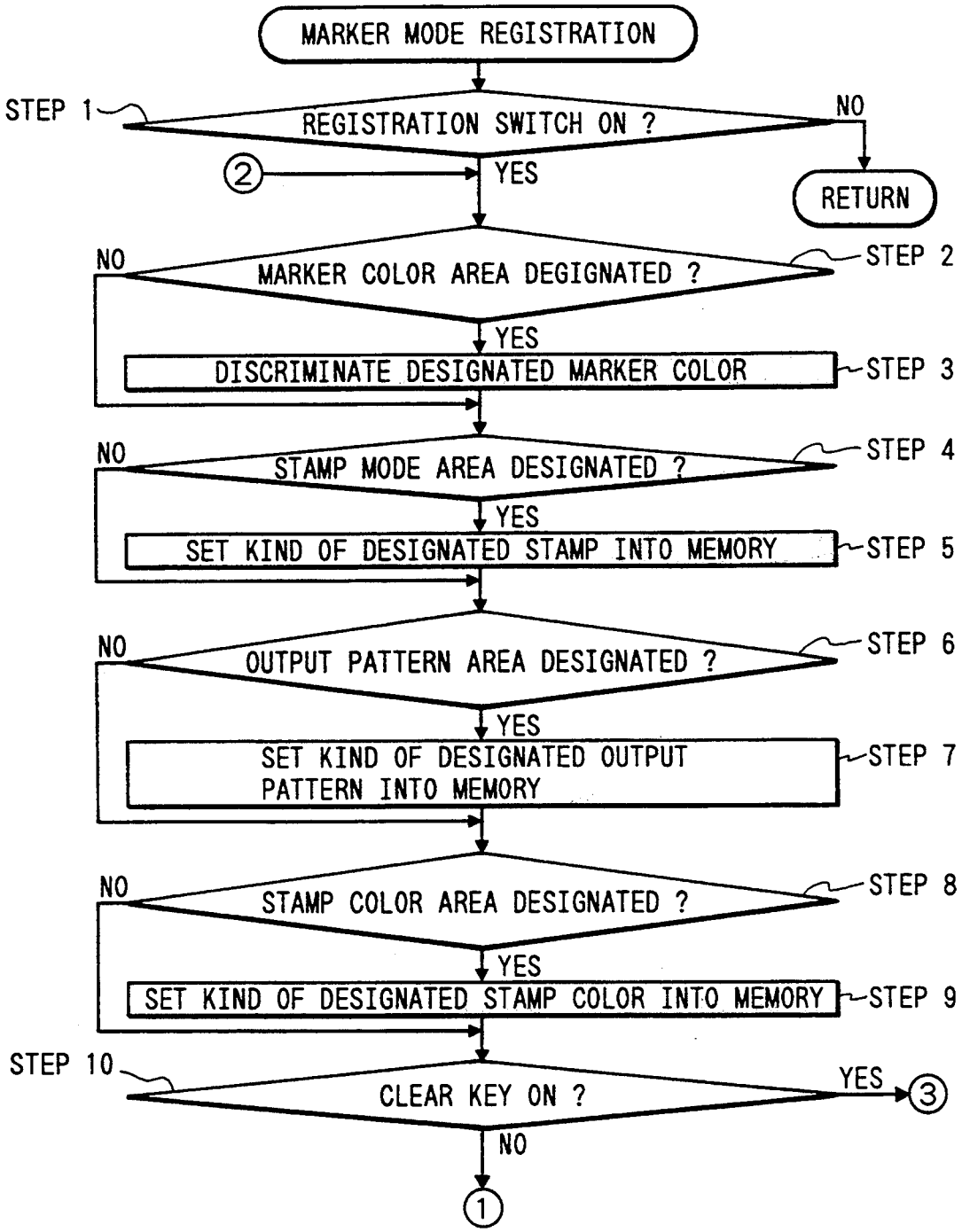

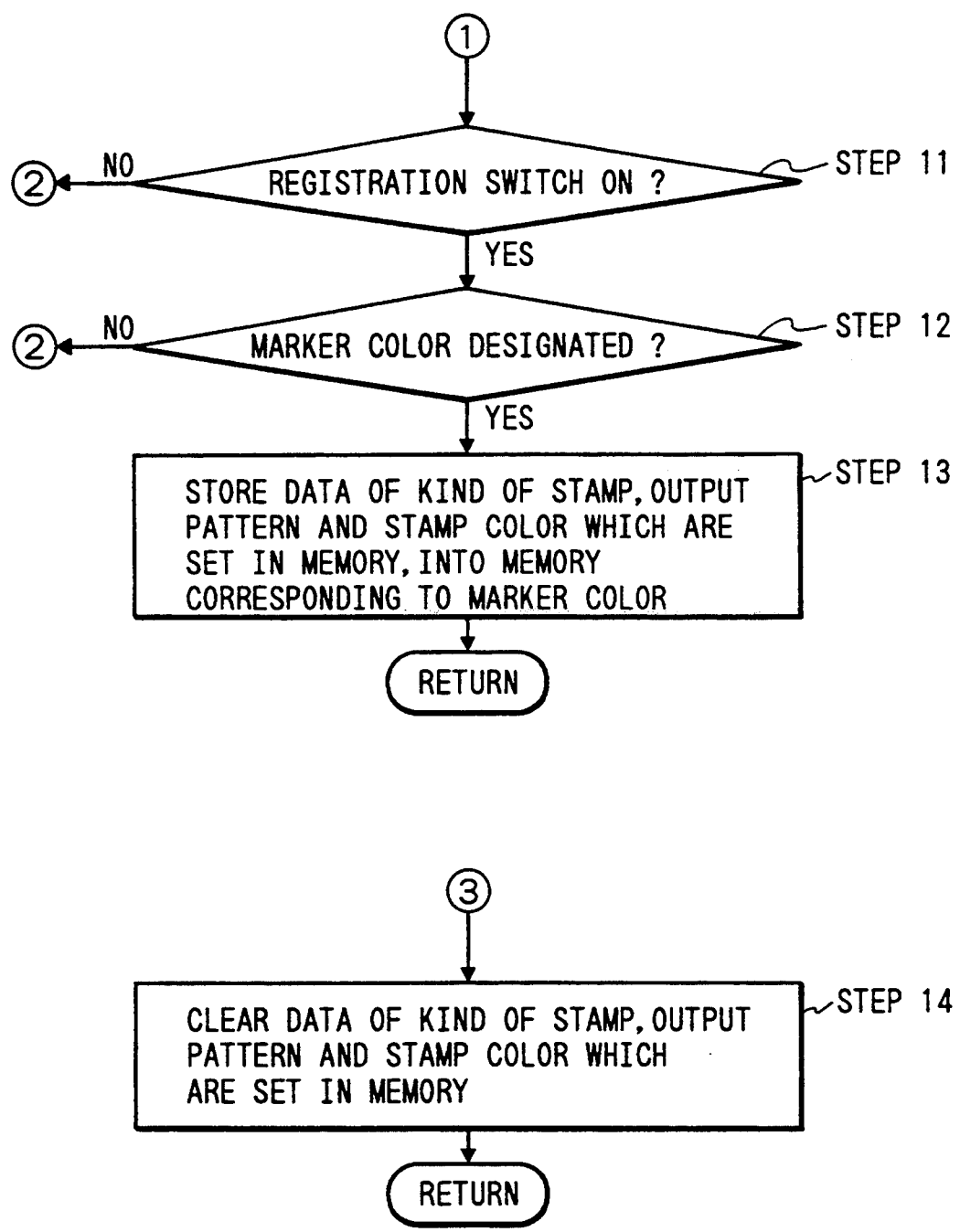

IMAGE FORMING APPARATUS TO ADD ADDITIONAL INFORMATION TO ORIGINAL IMAGE

BACKGROUND OF THE INVENTION

Field of the Invention

The invention relates to an image forming apparatus which can add additional information to an original image.

Related Background Art

Hitherto, a function to add information such as date, number, symbol, or the like to an original image when the original image is copied is known.

A method of adding serial numbers to an original image is disclosed in U.S. Pat. No. 4,963,920. A technique such that a date and page numbers are added to an original image and the date and page numbers to be added can be copied in a designated color is disclosed in U.S. Pat. No. 4,943,833.

However, in the above related arts, the selection of information to be added, the position to be added, and the like must be designated by using keys of an operation unit, resulting in reduced operating efficiency. Moreover, there is also a case where the additional information is not added to a desired position due to a deviation of the mounting position of the original.

A technique such that information to be added to an original image is selected and an adding position is designated by using an editor is disclosed in U.S. Pat. No. 4,989,042. However, the designating operation must be performed a few times on the editor and the above technique is still inadequate from a viewpoint of the improvement of the operating efficiency. Moreover, there is also a case where the additional information is not added to a desired position due to a deviation of the mounting position of the original.

SUMMARY OF THE INVENTION

It is an object of the invention to provide an image forming apparatus which can solve the drawbacks mentioned above.

Another object of the invention is to provide an image forming apparatus which can easily select information to be added to an original image and can easily select an image forming condition of the selected additional information.

Still another object of the invention is to provide an image forming apparatus which can form an image having additional information to a desired position.

According to an embodiment of the invention, information marked by a predetermined color on an original is analyzed and, in accordance with the result of the analysis, the selection of the additional information, the forming position of the additional information, and the forming color of the additional information are determined, thereby improving the operating efficiency and accurately forming the additional information to a desired position.

The above and other objects and features of the present invention will become apparent from the following detailed description and the appended claims with reference to the accompanying drawings.

BRIEF DESCRIPTION OF THE DRAWINGS

FIGS. 6A and 6B when taken together as shown in FIG. 6 comprise a block diagram for explaining a construction of a laser unit shown in FIG. 2;

FIGS. 18A and 18B when taken together as shown in FIG. 18 comprise a flowchart showing a registering process in the stamp mode.

DETAILED DESCRIPTION OF A PREFERRED EMBODIMENT

Figure 1:
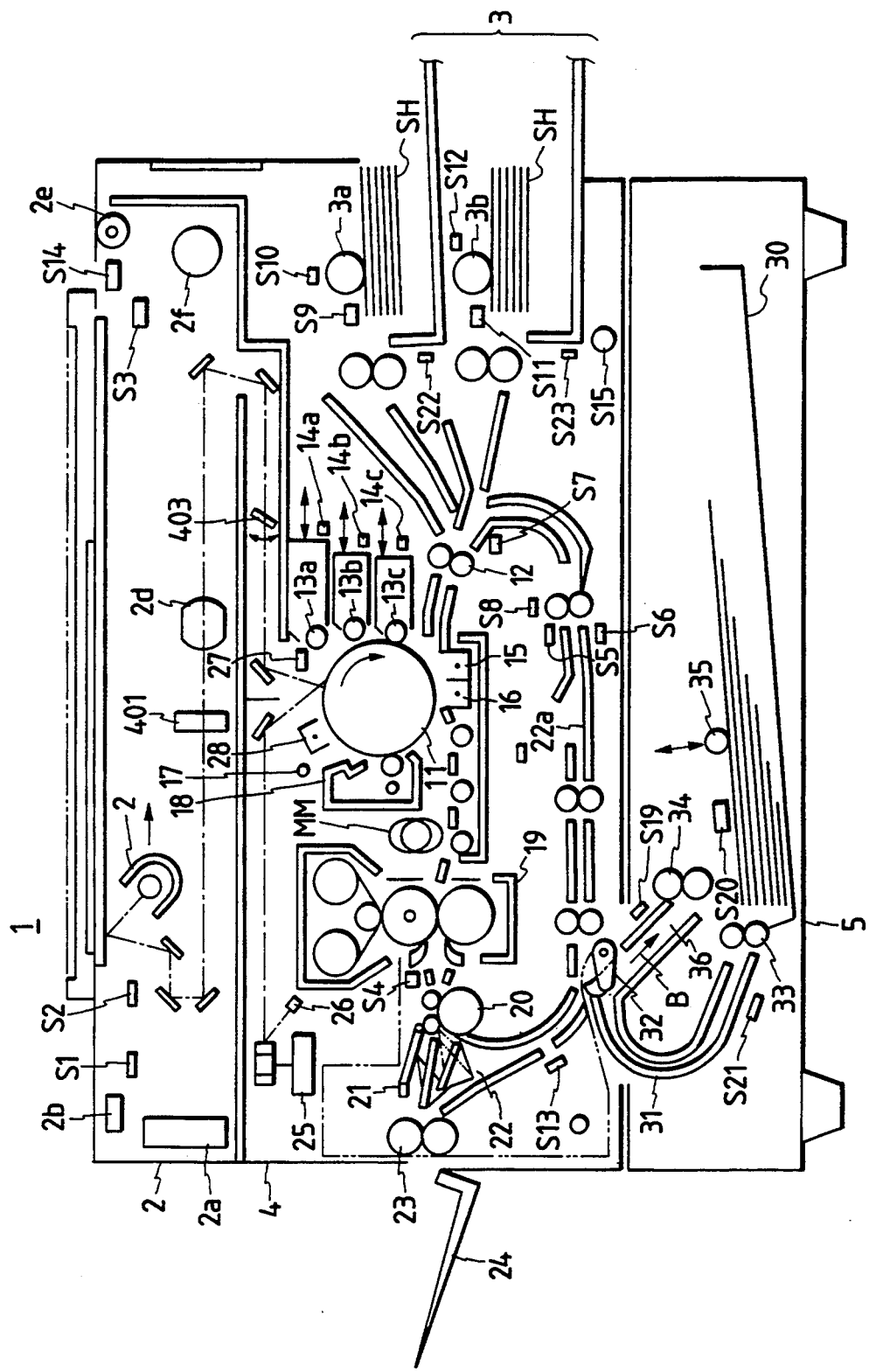
FIG. 1 is a cross sectional view for explaining a construction of an image forming apparatus showing an embodiment of the invention.

FIG. 1 is a cross sectional constructional diagram for explaining a construction of an image forming apparatus showing an embodiment of the invention. An image forming apparatus main body 1 is constructed by an original scan unit 2, a paper feed unit 3, an image forming unit 4, an intermediate tray unit 5, and the like.

A construction of the original scan unit 2 will be first explained.

Reference numeral 2a denotes a controller unit which is constructed on a control board on which a control device to collectively control an image forming sequence is integratedly formed. Reference numeral 2b denotes a power switch. An original exposing lamp 2c forms an optical scanning system together with a scan mirror and scans and moves at a predetermined speed. Reference numeral 2d denotes an image forming lens to form an image of the reflected light of an original onto a photo sensitive drum 11 of the image forming unit 4; 2e a buzzer unit to warn and inform of an image forming mode error or the like set by an operation unit 41, which will be explained hereinlater; and 2f an optical system driving motor (optical motor) to highly finely drive the optical scanning system or the like. Reference 401 denotes a CCD unit which is arranged near the image forming lens 2d on an analog optical path to lead the reflected light of the original onto the photo sensitive drum 11 and can read information of a predetermined color component of the original.

The paper feed unit 3 will now be described.

Reference numerals 3a and 3b denote paper feed rollers. A cut sheet SH is fed into the image forming unit 4 by the driving of the paper feed rollers 3a and 3b.

The image forming unit 4 will now be explained. Reference numeral 12 denotes a resist roller for temporarily stopping the cut sheet SH which has been fed by the driving of the paper feed rollers 3a and 3b and for again feeding the cut sheet SH while performing a synchronization to match the front edge of the image. Reference numerals 13a, 13b, and 13c denote developing units in which developing agents (red, black, blue) of respective colors are enclosed. By the driving of solenoids 14a, 14b, and 14c, either one of the developing units 13a, 13b, and 13c is selectively arranged at a position near the photo sensitive drum 11 and the others are arranged so as to be away from the drum 11. The controller unit 2a controls the driving of the solenoids 14a, 14b, and 14c so as to execute a different-color development of red/black to only a recording medium (cut sheet SH) for a special original by the controller unit 2a in the case where a color recording mode is set by an operating unit, which will be explained hereinlater. Reference numeral 5 denotes a copy transfer charging device for copy transferring toner images developed by the developing units 13a, 13b, and 13c onto the cut sheet SH. After they were copy transferred, the cut sheet SH is separated from the drum 11 by a separation charging device 16. Reference numeral 17 denotes a pre-exposing lamp for neutralizing the surface potential of the drum 11 in order to prepare for the primary charging. Reference numeral 18 denotes a cleaning device which includes a cleaning blade and a cleaning roller and collects the toners remaining on the drum 11; 19 a fixing device to fix the toner images transferred onto the cut sheet SH by a heat and a pressure; 20 a conveying roller; 21 a flapper for switching the conveying direction of the cut sheet SH whose fixing process has been finished to the direction of the intermediate tray unit 5 through a paper discharge roller 23 or a conveying path 22; 24 a paper discharge tray; and 25 a scanner motor #or rotating a rotational polygon mirror at a predetermined speed and for deflecting a laser beam which is generated from a semiconductor laser 26. A digital scan unit includes the scanner motor 25, semiconductor laser 26, and the like. The laser beam is turned on on the basis of font information corresponding to input add-on information (additional information). A multiplexed image of the original image and the add-on information is formed. The laser beam irradiates a latent image area formed on the photo sensitive drum 11 and the latent image is selectively erased. Or, the laser beam modulated in accordance with the data which has been image processed on the basis of the color information read out from the CCD unit 401 is irradiated and the latent image is selectively erased. The irradiating position of the laser beam onto the drum 11 is set to the downstream side with respect to the drum rotating direction and the position at which the reflected light of the original is projected to the drum 11. Reference numeral 27 denotes an exposure shutter (hereinafter, also simply referred to as a shutter) for shutting off a part or all of the reflected light of the original and for blocking the formation of the latent image by the reflected light of the original; 403 a red filter to erase the red image; 28 a primary charging device; 22a a conveying path; and MM a main driving motor.

A construction of the intermediate tray unit 5 will now be described. Reference numeral 30 denotes an intermediate tray for temporarily storing the cut sheet SH which is conveyed through a conveying roller 34 and for again feeding the cut sheet to the image forming unit 4 through a conveying path 31 by the driving of paper feed rollers 33 and 35. Reference numeral 32 denotes a flapper and 36 indicates a conveying path. In the diagram, $S_1$ to $S_{15}$ and $S_{19}$ to $S_{23}$ denote sensors. The sensor $S_1$ detects the home position of the optical system as an analog scan unit. The optical system stops at the home position in the standby state. The sensor $S_2$ detects that the optical system has moved to the position corresponding to the front edge position of the original image. The timing of the copy sequence is controlled by an output of the sensor $S_2$. The sensor $S_3$ detects the limiter position (reversing position) at the time of maximum scan. The optical system performs a reciprocating operation by a scan length according to a cassette size and a magnification which have been computed by an operation unit, which will be explained hereinlater.

Figure 2:
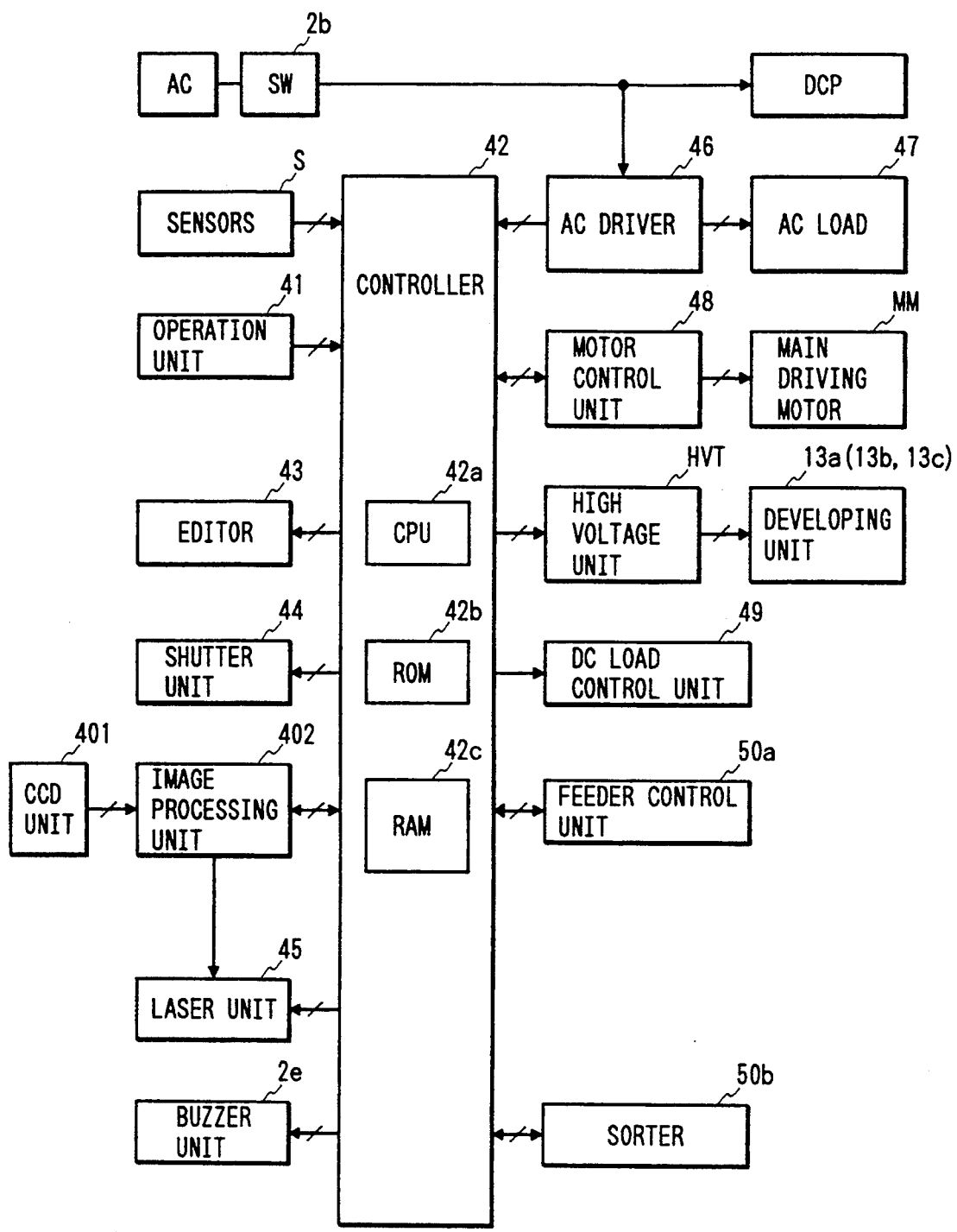
FIG. 2 is a block diagram for explaining a construction of a controller unit shown in FIG. 1.

FIG. 2 is a block diagram for explaining a construction of the controller unit 2a shown in FIG. 1. The same parts and components as those shown in FIG. 1 are designated by the same reference numerals.

In FIG. 2, reference numeral 41 denotes the operation unit having keys to set a copy mode (one-sided copy, two-sided copy, multiple copy, color mode, magnification, paper size, etc.); 42 a control unit (controller) which includes a CPU 42a, a ROM 42b, a RAM 42c, and the like and collectively controls the image forming sequence on the basis of a control program stored in the ROM 42b; 43 an editor for inputting area information for a desired area of the original; 44 a shutter unit comprising the exposure shutter 27 and a solenoid; and 401 the CCD unit for detecting the color information of the original, for executing image processes by an image processing unit 02 in accordance with a command from the controller 2, and for transferring the processed signal to a laser unit 45. The laser unit 45 includes the semiconductor laser 26, scanner motor 25, and the like. Reference numeral 46 denotes an AC driver to supply AC power to an AC load 47 such as an original exposing lamp 2c and the like; 48 a motor control unit to control the driving of the motor unit; 49 a DC load control unit to control the driving of the solenoids 14a and 14b, a clutch, a fan, and the like; 50a a feeder control unit to control the driving of the original feeding unit; and 50b a sorter to discharge the cut sheet SH which is discharged by the driving of the paper discharge roller 23 to a designated paper discharge bin. HVT denotes a high voltage unit to apply predetermined voltages to the charging system and developing sleeves of the developing units 13a, 13b, and 13c. DCP denotes a DC power source to supply a control voltage of +5 V to the controller unit 2a and the like. When the power switch 2b is turned on, a current is supplied to a heater in the fixing device 19 (FIG. 1) and the apparatus waits until a temperature of the fixing roller reaches a predetermined temperature at which it can fix (waiting time). When it reaches the predetermined temperature, the main driving motor MM is driven for a predetermined time, the photo sensitive drum 11, fixing device 19, and the like are driven, and temperatures of the rollers in the fixing device 19 are set to a uniform temperature (wait cancel rotation). After that, the main driving motor MM is stopped and the apparatus waits in a copy enable state (standby mode). The main driving motor MM drives the drum 11, fixing device 19, developing units 13a to 13c, and various rollers to convey the copy transfer paper. When a copy command is supplied from the operation unit 41, the image forming sequence is started.

(1) Description of the Image Formation

The main driving motor MM rotates in response to a copy command and the drum 11 starts to rotate in the direction shown by an arrow (FIG. 1). A high voltage is supplied from the high voltage unit HVT to the primary charging device 28 and uniform charges are applied to the drum 11. Subsequently, the original exposing lamp 2c is turned on, the optical motor 2f is driven, the original put on the original base is scanned and exposed in the direction shown by the arrow (FIG. 1), and the exposed original image is projected onto the drum 11. An electrostatic latent image is formed on the drum 11 as described above. In this instance, unnecessary charges in the areas out of the image area are erased by a laser unit comprising the semiconductor laser 26, rotational polygon mirror, and the like. The latent image is subsequently developed by either one of the developing units 13a to 13c and copy transferred onto the cut sheet SH in the portion of the copy transfer charging device 15. The cut sheet SH is separated from the drum 11 in the poriton of the separation charging device 16. The toner remaining on the drum 11 is subsequently collected by the cleaning device 18 and the drum surface is uniformly discharged by the pre-exposing lamp 17 and, thereafter, the copy cycle is again repeated. The laser unit can apply a laser beam to an arbitrary position on the drum 11 and can erase a part of the latent image. Further, in accordance with the stamp information (important, urgency, circulation, don't copy, secret, etc.) as add-on information sent from the operation unit 41 or in accordance with the color information which has been read by the CCD unit 401, the laser unit can turn on a laser beam and can form an electrostatic latent image of the additional information to be multiplexed to the original. One of the developing units 13a to 13c are come into contact with the photo sensitive drums 11 by a selection command from the operation unit 41. In the embodiment, a color toner (for example, red toner) is stored in the developing unit 13a, a black toner is stored into the developing unit 13b, a blue toner is stored in the developing unit 13c, and those developing units are allowed to approach or be away from the drum 11 by the solenoids 14a to 14c. A developing bias voltage is applied from the high voltage unit HVT to the developing sleeves of the developing units 13a to 13c. In the image forming apparatus of the embodiment, although not only the ordinary one-sided copy but also the two-sided copy or multiple copy can be made, states such as the resistance value of the paper and the like of the cut sheet SH which has once passed through the fixing device 19 are changed as compared with the states in the case of the copy of the first side. In order to cope with such a situation, the conditions of the high voltages which are applied to the copy transfer charging device 15 and separation charging device 16 are also made different with respect to the first side and the second side in the two-sided copy or multiple copy. The developing biases or the values of the high voltages for copy transfer and separation are controlled by the high voltage unit HVT. The reciprocating operation of the optical system is controlled by forwardly or reversely rotating the optical motor 2f by the motor control unit 48 in accordance with a command from the control unit (controller) 42.

(2) Control of the Cut Sheet SH

In FIG. 1, the sensors S9 and S11 respectively detect the absence of the paper in the cassettes at the upper and lower stages. The sensors $S_{10}$ and $S_{12}$ respectively detect lifting states of the paper feed rollers 3a and 3b. The sensors S22 and S23 detect the cassette size. After that, the similar operation is performed with regard to the upper and lower stages. Therefore, the paper feeding operation of the upper stage will now be described.

First, when the upper stage cassette is inserted, the paper size is detected by the sensor S22. The cassette size is discriminated. A paper absence indicator of the operation unit 41 is turned off. The lamp of the cassette size is selectively turned on. When the copy operation is started by a copy command, a middle plate ascending clutch (not shown) is turned on, a middle plate in the cassette ascends, and the cut sheet SH is elevated. Thus, when the cut sheet SH ascends and is come into contact with the paper feed roller 3a and reaches a predetermined height, the sensor S10 generates a detection signal. The clutch is turned off, the paper feed roller 3a is driven, and the cut sheet SH is fed into the apparatus. As mentioned above, the cut sheet SH in the cassette ascends as controlled by the middle plate ascending clutch. After that, the ascended position is held. When the next copying operation is started, the ascending operation is not performed. On the other hand, in the case where the number of cut sheets SH stored in the cassette decreases during the continuous copying operation and the upper surface of the top cut sheet SH is lower than a predetermined position, the clutch is similarly turned on, thereby ascending the cut sheets to a predetermined height. The cut sheet SH fed into the apparatus reaches the sensor $S_7$ and forms a proper loop and stops because the resist roller 12 is stopped. Subsequently, in order to match the front edge of the image formed on the photo sensitive drum 11 with the front edge of the cut sheet SH, the resist roller 12 is driven by a timing signal which is obtained by the movement of the optical system, thereby matching the front edges. After that, the image on the drum 11 is copy transferred onto the cut sheet SH by the copy transfer charging device 15. Subsequently, the cut sheet SH is separated from the drum 11 by the separation charging device 16 and is sent to the fixing device 19 by a conveying mechanism. In the fixing apparatus, the surface of the fixing roller is controlled to a predetermined temperature by a temperature sensor and a heater (not shown) which are arranged on the fixing roller surface. The image is fixed to the cut sheet SH by the fixing apparatus. After that, a paper discharge is detected by the sensor S4 and the cut sheet is discharged to the outside of the apparatus by the paper discharge roller 23.

In the case of the multiple copy, the flapper 21 is switched to the position shown by a broken line by the operation of the solenoid (not shown). The cut sheet SH which has been fed, copy transferred, separated and fixed, passes through the conveying path 22 and is sequentially conveyed along the conveying path 22a. After the paper is detected by the sensor $S_5$, the paper is positioned and matched in the lateral direction by the solenoid for lateral resist matching in accordance with the detection signals of the sensors $S_6$ and $S_8$. The resist roller 12 is driven by a command from the controller 42 and the cut sheet SH is sent to the position of the resist roller 12. After that, the paper is discharged to the paper discharge tray 24 in a manner similar to the above operation. In the two-sided copy mode, the copy transfer sheet is discharged by the paper discharge roller 23 in a manner similar to the above ordinary copying operation. However, after the rear edge of the cut sheet SH passed through the flapper 21, the paper discharge roller 23 is reversely driven, so that the cut sheet SH is guided by the flapper 21 and led to the conveying path 22. The reverse driving of the paper discharge roller 23 is performed by the solenoid to control the forward-/reverse rotation. The subsequent operations are executed in a manner similar to the case of the multiple copy mode described above. In the two-sided copy mode, as described above, the cut sheet SH is once discharged to the outside of the apparatus by the paper discharge roller 23 and the front and back sides of the cut sheet SH are reversed by the reverse driving of the paper discharge roller 23 and the cut sheet SH is subsequently sent to the conveying path 22a. The multiple copy and the two-sided copy of one cut sheet have been described above. In the case of the multiple copy or two-sided copy of a plurality of cut sheets, the copy is executed by using the intermediate tray unit 5. As shown in FIG. 1, the intermediate tray unit 5 has the intermediate tray 30 to temporarily enclose a plurality of cut sheets SH. In the case of the multiple copy of a plurality of cut sheets, under the control similar to the case in the two-sided copy mode of one sheet, a part of each of the fixed cut sheets SH is discharged by the paper discharge roller 23 and, thereafter, by reversely driving the paper discharge roller 23, it is enclosed onto the intermediate tray 30 through the conveying path 22, flapper 32, and conveying path 36. By repeating the above operations, all of the cut sheets SH in each of which the image of the first side has been copied are provided to the intermediate tray 30. After that, the feed roller 33 is driven to copy the second side by the next copy command and the copy of the second side is executed through the conveying path 36.

Figure 3:
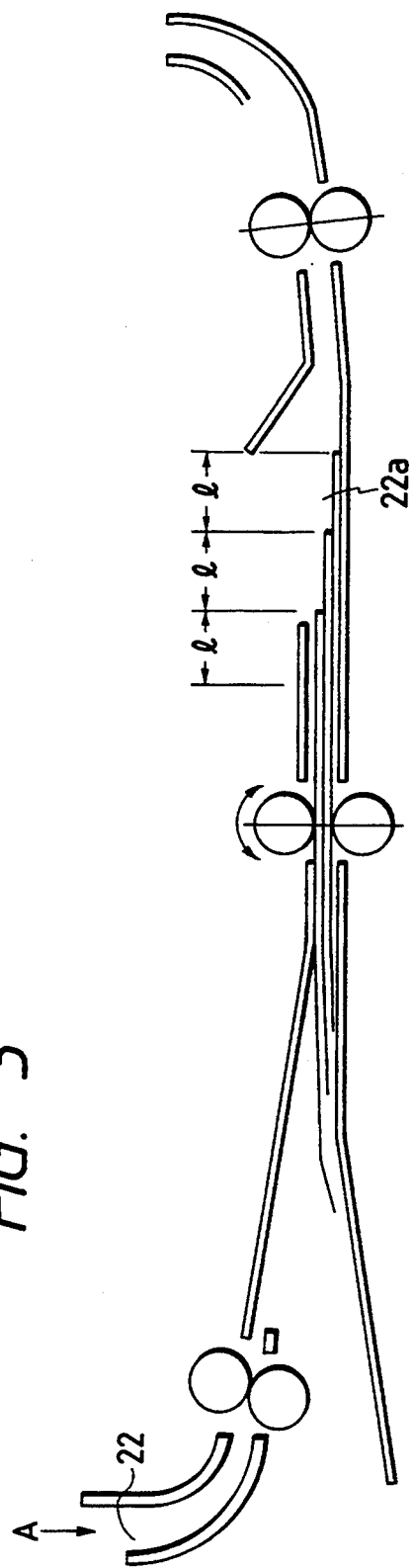
FIG. 3 is a cross sectional view for explaining a construction of a main section of an image forming apparatus main body shown in FIG. 1.

In the case of the two-sided copy of a plurality of cut sheets, under the control similar to the case of the multiple copy mode of one sheet, the cut sheets are conveyed from the fixing device 19 through the conveying paths 22 and 36 by the flapper 21 and are provided to the intermediate tray 30. The subsequent operations are executed in a manner similar to the case of the multiple copy described above, so that their descriptions are omitted here. In the apparatus in which the intermediate tray 30 is constructed in the image forming unit 4, as shown in FIG. 3, there is a limitation in a length of the cut sheet SH which can be temporarily enclosed. In case of using a method whereby the sheets are shifted one by one and stacked, the size of cut sheets SH which can be enclosed are set to be equal to or less than the half size.

Figure 4:
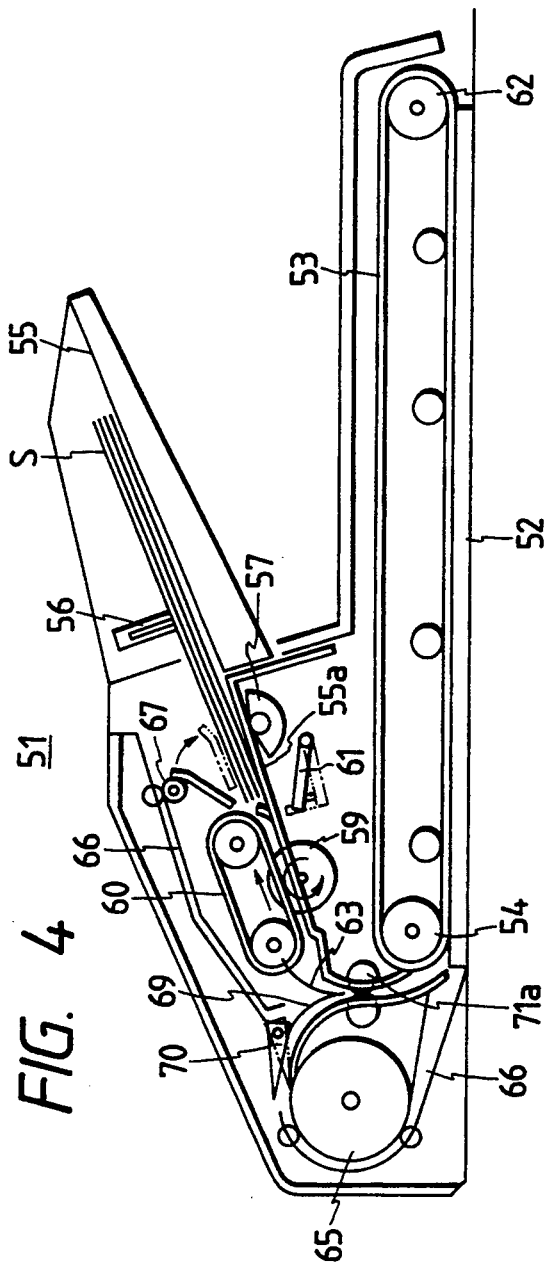
FIG. 4 is a cross sectional view for explaining an example of an automatic document feeder which is arranged on the upper surface of the image forming apparatus main body shown in FIG. 1.

FIG. 4 is a cross sectional view for explaining an example of an automatic document feeder which is disposed on the upper surface of the image forming apparatus main body 1 shown in FIG. 1. The same parts and components as those shown in FIG. 1 are designated by the same reference numerals. A structure and the operation will now be described hereinbelow.

An automatic document feeder 51 is arranged on a glass platen 52 of the original scan unit 2 and has a driving roller 54 and a conveying belt 53 wound around a driven roller 62. An original mounting base 55 is disposed above the conveying belt 53. A bundle of originals comprising a plurality of originals S can be mounted onto the base 55. A recycle lever 56 is arranged on the base 55. The originals S mounted on the original mounting base 55 are partitioned to the originals before processes and the originals after the processes by the recycle lever 56. A half-moon-shaped paper feed roller.57 is arranged in a base edge portion 55a of the base 55. A separation unit comprising a separation unit conveying roller 59 and a separating belt 60 is arranged on the downstream side of the paper feed roller 57. The bundle of originals mounted on the base 55 are sent toward the conveying roller 59 and separating belt 60 by a paper feed roller 57 and are sequentially separated and fed one by one from the bottom original S by the separating belt 60 which rotates in the original feeding direction. A paper feed stopper 61 is situated near the paper feed roller 57, the conveying roller 59, and the separating belt 60. When the original bundle S are set, the stopper 61 is located at the position shown by a solid line and the front edge of the original is positioned. When the original is fed, the stopper 61 moves to the position shown by a broken line by supplying a current to a stopper solenoid. Further, a paper feed path 63 is provided in a path from the downstream of the roller 59 and belt 60 to the belt 53. The original S which was fed from the conveying roller 59 and separating belt 60 passes through the paper feed path 63 and is sent to a position between the conveying belt 53 and the glass platen 52 and is put at a predetermined position on the glass platen 52. A paper discharge path 66 extending to the original mounting base 55 along the outer periphery of a reversing roller 65 is arranged near the paper feed path 63. The original S put at the predetermined position of the glass platen 52 is again conveyed and passes through the paper discharge path 66 and is discharged to the top portion of the original bundle S mounted on the base 55 by a paper discharge roller 67 provided at the downstream edge of the paper discharge path 66. Further, a reversing path 69 is provided which is shunted from the paper discharge path 66 at a position over the reversing roller 65 and is connected to the paper feed path 63. A flapper 70 to switch the conveying path of the original S is arranged in the branch portion of the reversing path 69 and the paper discharge path 66. When the original is discharged, the flapper 70 guides the original in the direction of the original mounting base 55 at the position shown by a solid line. When the original is reversed, the flapper 70 is moved to the position shown by a broken line by the current supply to a flapper solenoid and guides the original S in the direction of the glass platen 52 along the reversing path 69. A conveying roller 71a is arranged downstream from the connecting portion of the paper feed path 63 and the reversing path 69 and is constructed so that the original guided to the paper feed path 63 or reversing path 69 is conveyed toward the glass platen 52.

Figure 5:
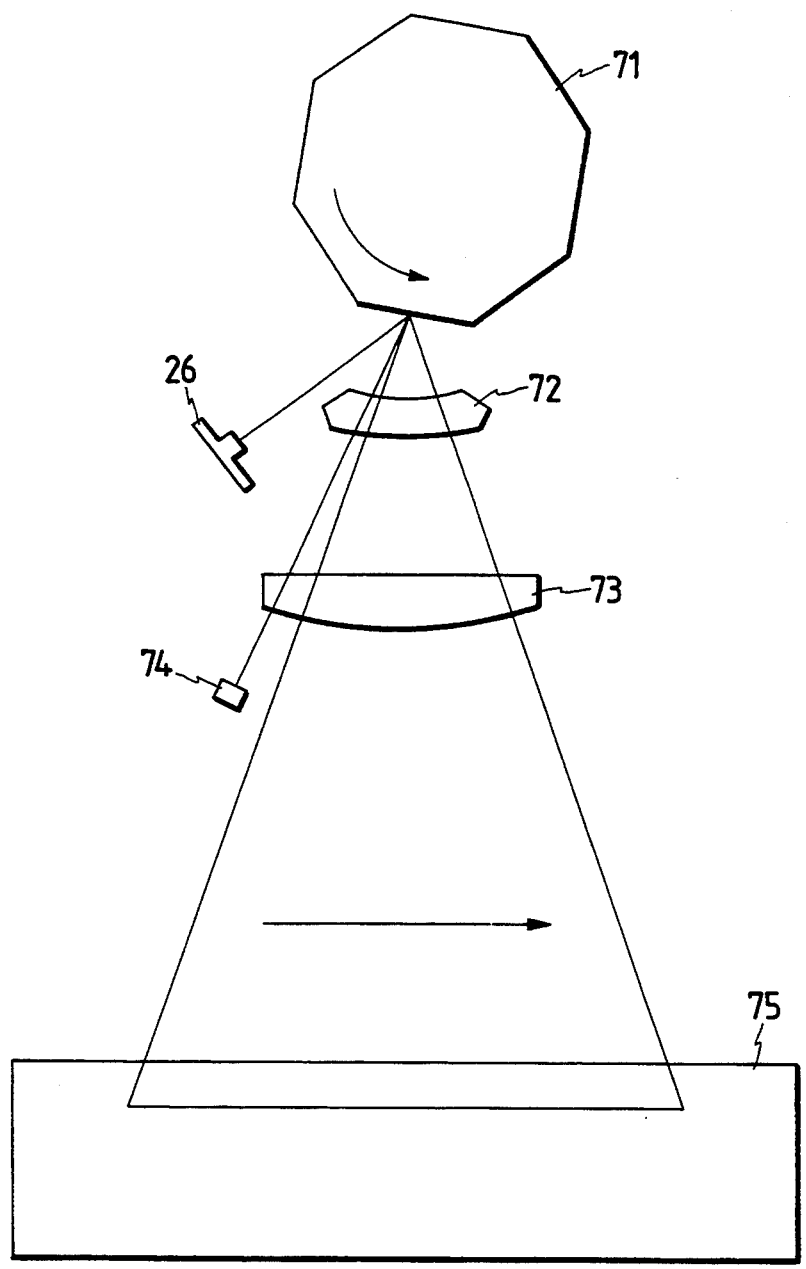
FIG. 5 is a plan view for explaining the scanning operation of a semiconductor laser shown in FIG. 1.

FIG. 5 is a plan view for explaining the scanning operation of the semiconductor laser 26 shown in FIG. 1. In the diagram, reference numeral 71 denotes a polygon mirror which is rotated in the direction shown by an arrow at a constant speed by the scanner motor 25. The polygon mirror 71 deflects the laser beam radiated from the semiconductor laser 26 and allows the laser beam to be modulated on the basis of the digital information to form an image on the drum 11 through a spherical lens 72, a toric lens 73, and a turn-around mirror 75. Reference numeral 74 denotes a beam sensor comprising, for example, a photo diode or the like. The beam sensor 74 receives the laser beam just before the image is written onto the drum 11 and generates a beam detection signal for provision to a pulse width shaping circuit 90, which will be explained hereinlater.

Figures 6, 6A:
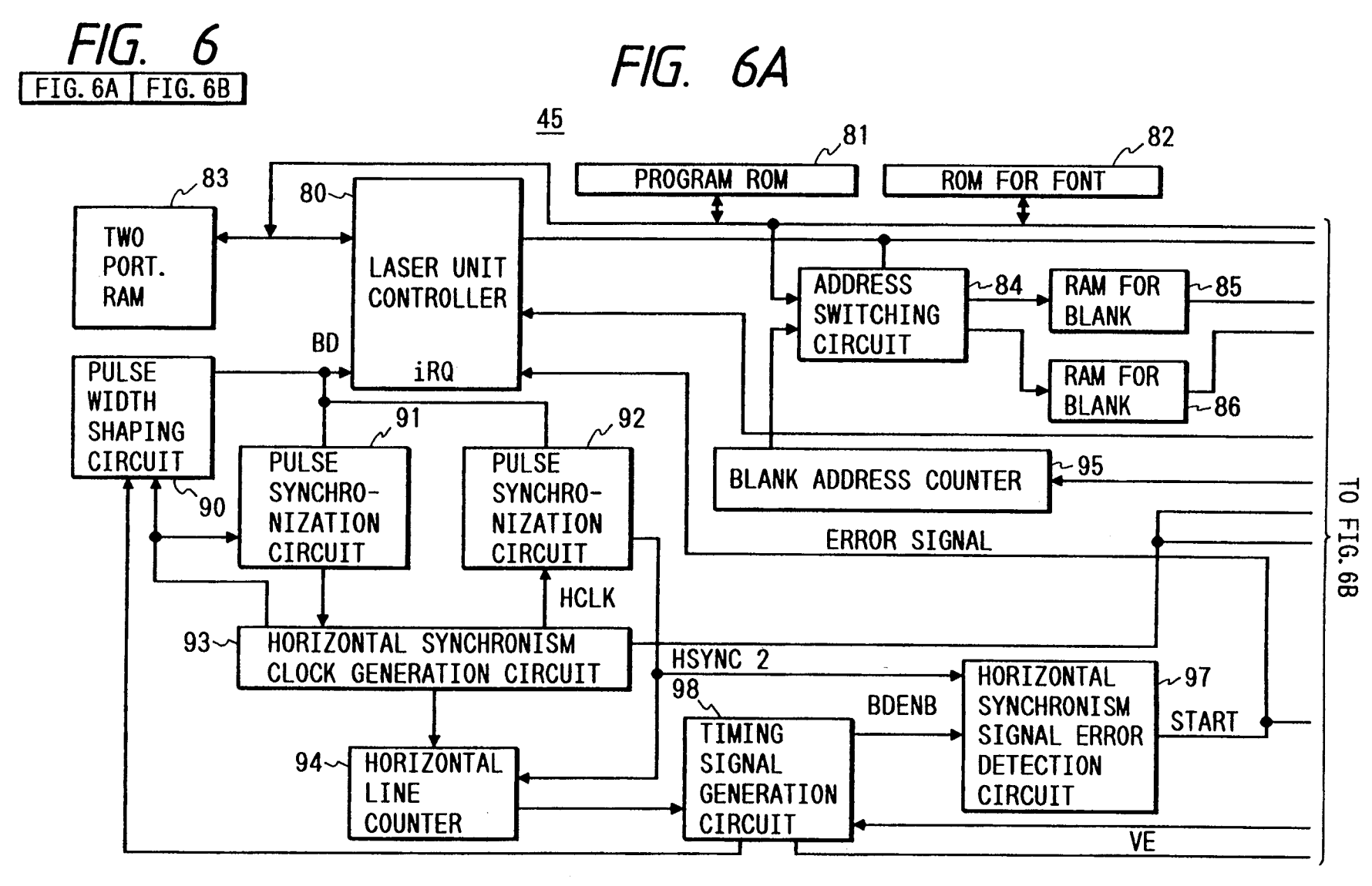

FIG. 6 is a block diagram for explaining a construction of the laser unit 45 shown in FIG. 2. The structure and the operation will be described hereinbelow.

Laser unit control information such as position of a predetermined blank area, copy magnification, paper size, photograph mode, add-on character code, add-on position, base color area, and the like is provided from the controller 42 to a laser unit controller 80 through a well-known 2-port RAM 83. The blank area denotes an area to be erased by the first scan in a sequence, which will be explained hereinlater, in the latent image formed by an analog image scan system. The blank area can also be designated by marking the original with a marker pen.

The laser unit controller 80 alternately rewrites erase data, to erase by the laser, into RAMs 85 and 86 for blank in accordance with a program stored in an ROM 81, which can be exchanged. Control signals are supplied to a blank address counter 95 and an 8-bit shift register 88 from a data read-out control circuit 96 for the blank area. Area data is supplied to a data control circuit 100. Each of the blank RAMs 85 and 86 has a capacity sufficient to write data of a size of one line. The controller 80 supplies control signals to an address switching circuit 84 and a blank data switching circuit 87 in a manner such that while the area data is written into one of the blank RAMs 85 and 86, the data can be read out from the other RAM. The address control will be further described.

Stamp information 140 ("SECRET", "URGENCY", "CIRCULATION", "IMPORTANT", "DON'T COPY"), which will be explained hereinlater, a font corresponding to a character code designated from the input information area, and predetermined multiplex pattern data are stored in a font ROM 82. Under control of the laser unit controller 80, font data is read out from the ROM 82 in accordance with add-on character code information and set into an add-on RAM 103. Add-on character position designation data is written into the controller 80. An add-on controller 89 reads out the data from the add-on RAM 103 by a start signal from the controller 80 and supplies the read-out data to the data control circuit 100.

As shown in FIG. 5, the laser beam which is radiated from the semiconductor laser 26 is deflected by the rotating polygon mirror 71 and scans the photo sensitive drum 11 through the spherical lens 72 and toric lens 73. In this instance, in order to take out a horizontal sync signal, a beam sensor 74 comprising a photo diode or the like is arranged to sense the laser beam scan. A photo detection signal generated from the beam sensor 74 is supplied to the laser unit 5 and to a pulse width shaping circuit 90, for waveform shaping. After that, a BD signal is supplied to a pulse synchronization circuit 91, an interruption terminal of the laser unit controller 0, and a pulse synchronization circuit 92. Each time the BD signal is generated, the controller 80 generates an interruption command and writes control data into the RAMs 85 and 86. The controller 80 counts the number of times the BD signal is generated and generates a control signal in the sub-scanning direction. The pulse synchronization circuit 91 generates a reset pulse to a horizontal synchronism clock generation circuit 93 synchronously with a leading edge of the above BD signal. The circuit 93 generates a clock HCLK synchronized with the BD signal and is constructed by a reference clock generation circuit and a frequency dividing circuit. The pulse synchronization circuit 92 generates a BD synchronism signal $HSYNC_2$ to synchronize the BD signal by using the horizontal synchronism clock HCLK as a reference. The horizontal synchronism clock HCLK is counted by the BD synchronism signal $HSYNC_2$. An output of a horizontal line counter 94 is supplied to a timing signal generation circuit 98. A horizontal timing signal is generated from the counter 94 when the count number reaches a preset count value.

Figure 7:
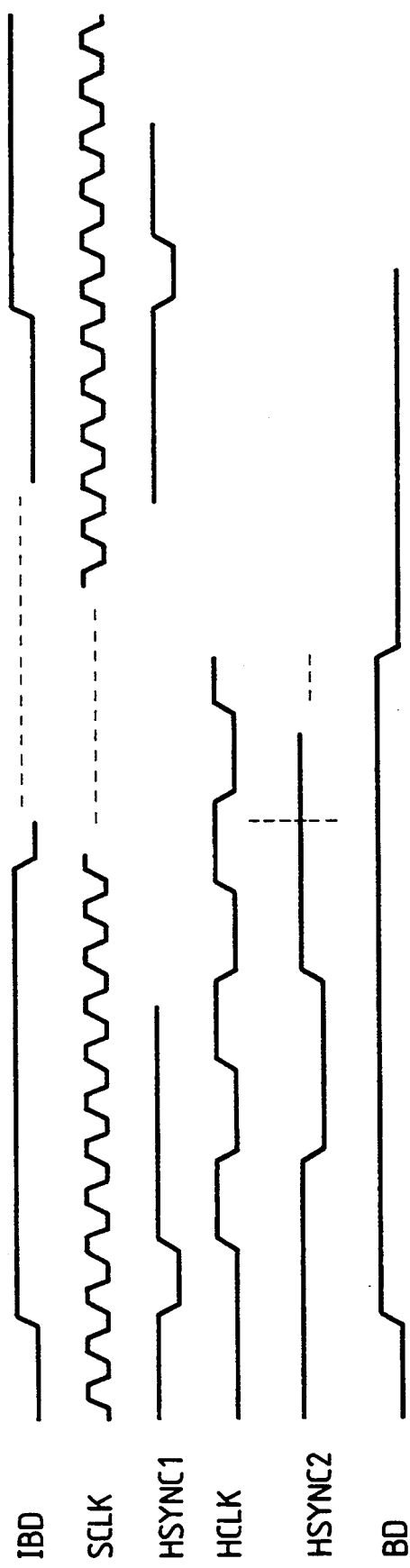
FIG. 7 is a timing chart for explaining a transmission timing of each signal shown in FIG. 6.
Figure 8:
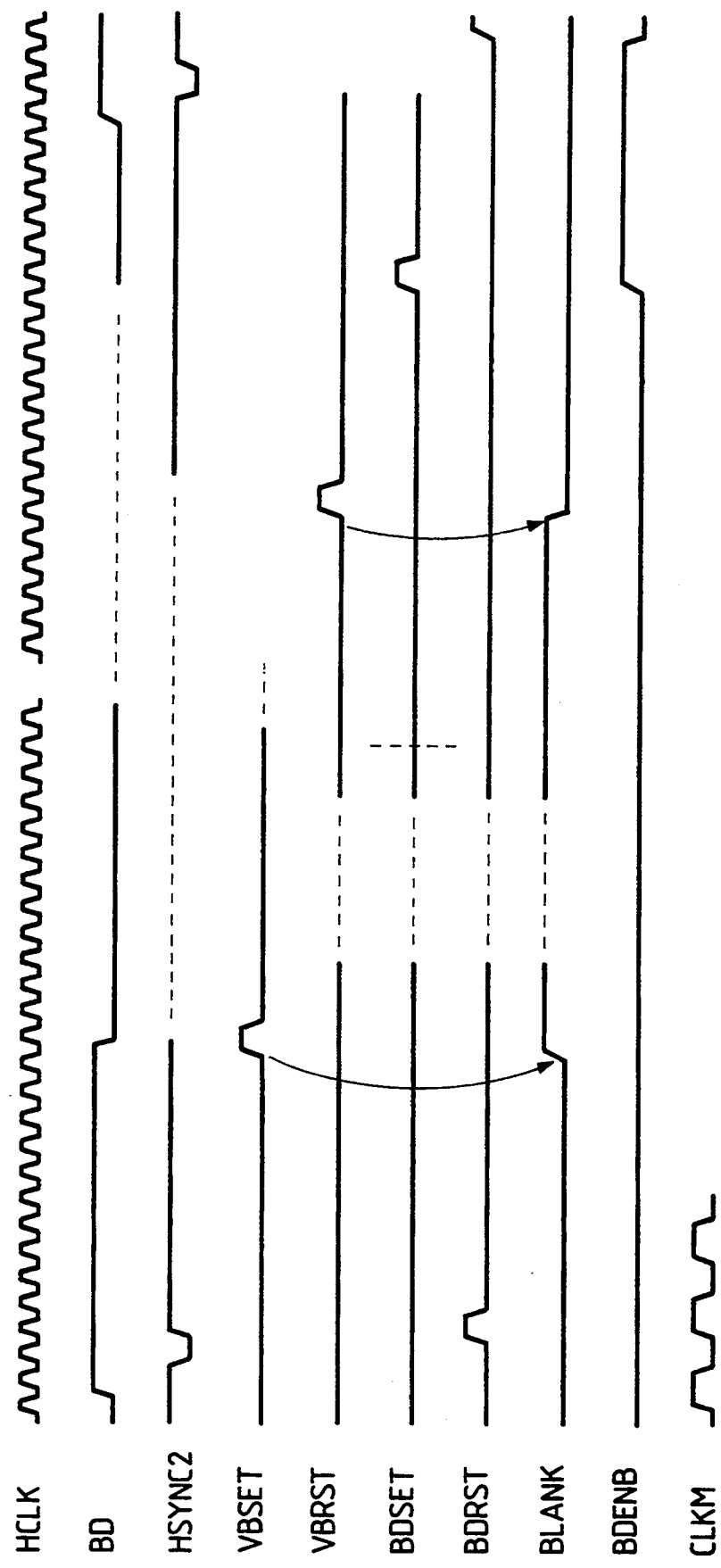
FIG. 8 is a timing chart for explaining a transmission timing of each signal shown in FIG. 6.

FIGS. 7 and 8 are timing charts for explaining transmission timings of the signals shown in FIG. 6. The same signals as those shown in FIG. 6 are designated by the same reference characters.

As shown in FIG. 7, by resetting a reference clock frequency dividing counter in the horizontal synchronism clock generation circuit 93 by a leading detection pulse $HSYNC_1$, the horizontal synchronism clock HCLK is generated. The BD synchronism signal $HSYNC_2$ is subsequently generated by the horizontal synchronism clock HCLK and the horizontal line counter 94 is reset. As shown in FIG. 8, a set signal VBSET and a reset signal VBRST are produced from an output of the horizontal line counter 94, thereby generating an image area signal blank signal. A clock to read out the data from the add-on RAM 103 is formed by using the horizontal synchronism clock HCLK. A color CLKM obtained by frequency dividing the horizontal synchronism clock HCLK is used as a clock to read out the data from the RAMs 85 and 86 for blank, thereby enabling a resolution of the designation of the blank area to be varied. A BD enable signal BDENB is produced by the set signal VBSET and reset signal VBRST. When no horizontal sync waveform (beam detection signal) is input in a predetermined time interval, a horizontal synchronism signal error detection circuit 97 provides a BD error signal to the laser unit controller 80. When the above BD error signal is detected, the controller 80 provides an abnormality status signal to the controller unit 2a through the 2-port RAM 83. Reference numeral 99 denotes a dot erasing circuit which supplies erase data DEDATA to the data control circuit 100 so as to form a dot pattern which has been set in a base color mode or a screen mode. Reference numeral 101 denotes a laser driving circuit which starts the light amount control in response to a control start signal APCON and a clock APC from the controller unit 2a. In this instance, a ready signal APCRDY is supplied from the laser driving circuit 101 to the controller unit 2a. Reference numeral 105 denotes a CCD data control circuit to which signals such as image data from the CCD unit 401, marker area data, and the like are supplied and stored into a line memory 104. The data is read out from the line memory 104 in correspondence to a magnification changing ratio on the basis of a magnification changing signal from the controller 42. The signals such as image data, marker area data, and the like are sent to the data control circuit 100 synchronously with a signal FDATA of the foregoing add-on information, a signal BDATA of the blank information, and a dot erase signal DEDATA. From the CCD data control circuit 105, a start point and an end point in the horizontal synchronizing direction as image addresses on the original of the area data by the marker and address signals of the start point and end point addresses in the horizontal line direction are written into the 2-port RAM 83 via the laser unit controller 80. Reference numeral 102 denotes a laser scanner motor controller which executes the drive control of the scanner motor 25 synchronously with a control start signal LSCON from the controller unit 2a. In this instance, the laser scanner motor controller 102 generates a ready signal LSCRDY to the controller unit 2a.

A setting process of an add-on information mode and an add-on information inputting process will now be described with reference to FIGS. 9 and 10.

Figure 9:
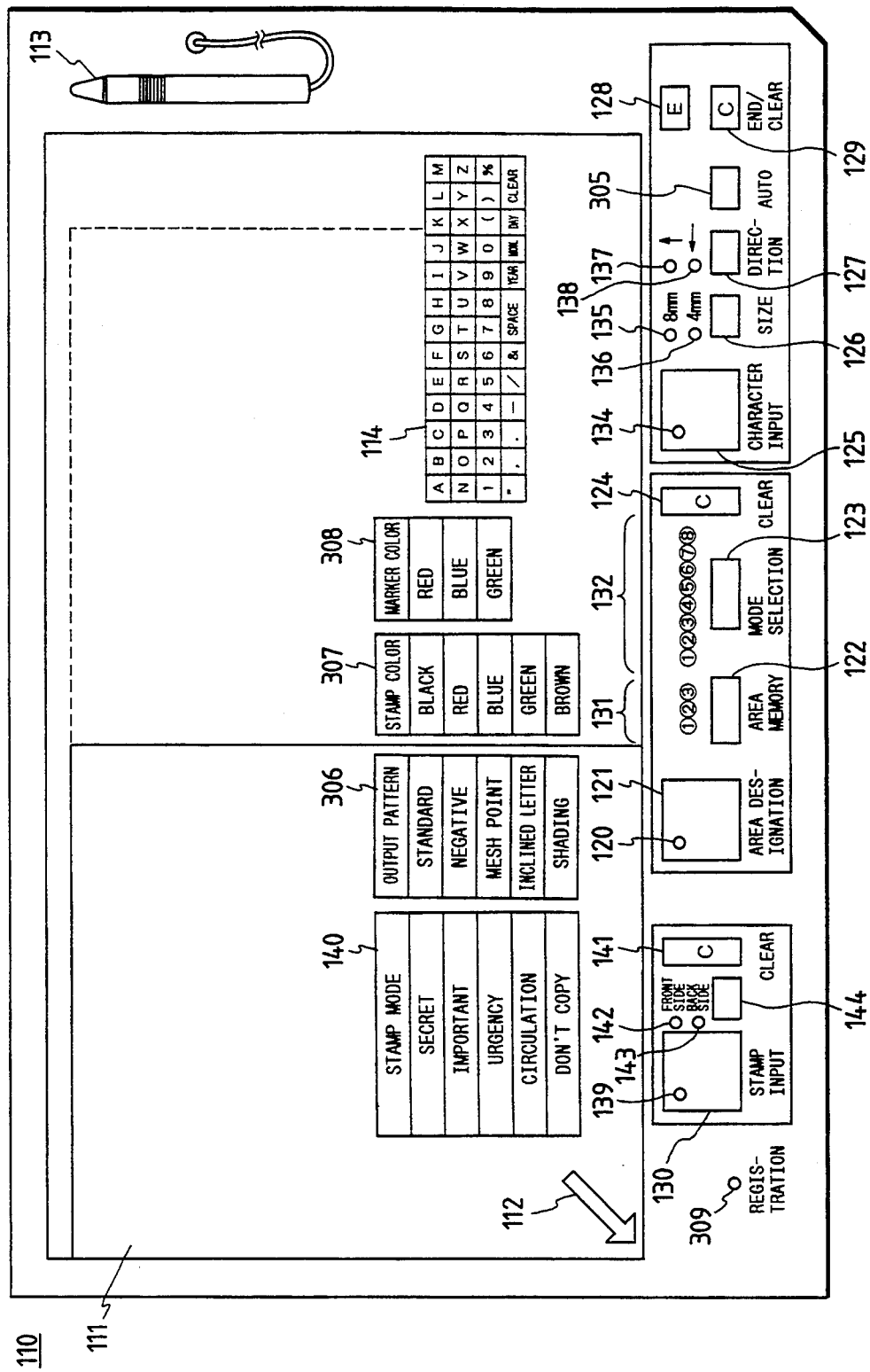
FIG. 9 is a plan view for explaining a construction of an editor shown in FIG. 2.

FIG. 9 is a plan view for explaining a construction of the editor 43 shown in FIG. 2. Reference numeral 110 denotes an editor unit also serving as an original pressing plate to press a copy original put on the original glass base; 111 a set side of the original onto which the original is put when an area is designated; 112 a reference mark on which the edge portion of the original abuts; 114 an input information area into which character information which is shown in the diagram can be inputted; and 121 an area designation key which is depressed when the area designating mode is set. When the area designation key 121 is depressed, an area designating mode display 120 is turned on. Reference numeral 122 denotes an area memory key. When the area designation key 121 is depressed, the area memory key 122 is depressed in the case of storing area information of the position indicated by a stylus pen 113. Reference numeral 123 denotes a mode selection key which is depressed when the area designation key 121 is depressed and the designated area is printed for every color by designating a proper one of the developing units 13a to 13c. When the mode selection key 123 is depressed, seven kinds of combinations of two and three colors according to the colors of the toners stored in the developing units 13b and 13c which can be exchanged in place of the developing unit 13a are displayed on a display 132. When the area memory key 122 is depressed, a display 131 is turned on in accordance with the number of areas stored (three in the embodiment). Reference numeral 124 denotes a clear key which is depressed when the set area designating mode is cancelled. When the clear key 124 is depressed, the area designating mode display 120 is turned off. An add-on mode setting key 125 is depressed to write characters into a copy image. A display 134 is lit on by the depression of the add-on mode setting key 125. Reference numeral 126 denotes a character size designation key by which a size of character to be multiplexed and written can be designated to 4 mm or 8 mm in the embodiment. A display 135 or 136 of the designated size is turned on. A direction designation key 127 is depressed when the writing direction of add-on characters is designated to the vertical direction or lateral direction. A display 137 or 138 of the designated direction is turned on. Reference numeral 305 denotes an auto key which is depressed when a marking of a predetermined color written on the original is recognized and the writing direction of the add-on characters is automatically determined. Reference numeral 128 denotes an input end key which is depressed when the input of the add-on characters is finished. A clear key 129 is depressed in case of cancelling the add-on mode. Reference numeral 130 denotes a stamp mode setting key. When the stamp mode setting key 130 is depressed, a display 139 is turned on. By indicating the stamp information (secret, important, urgency, circulation, don't copy) or the like which has previously been printed in the stamp information selection area 140 of the set side 111 of the original by the stylus pen 113, the one selected stamp information is provided to the controller 42. The stamp information which is lastly been indicated is selected. Further, reference numeral 144 denotes a key to indicate the front or back side of the two-sided original; 142 and 143 are indicators to show the instructed state regarding the front or back side; and 141 a clear key. When the clear key 141 is depressed, the stamp mode is cancelled. Reference numeral 306 denotes an output pattern information selection area; 307 a stamp color information selection area; 308 a marker color information selection area; and 309 a switch to register a processing mode of each marker color.

Figure 10:
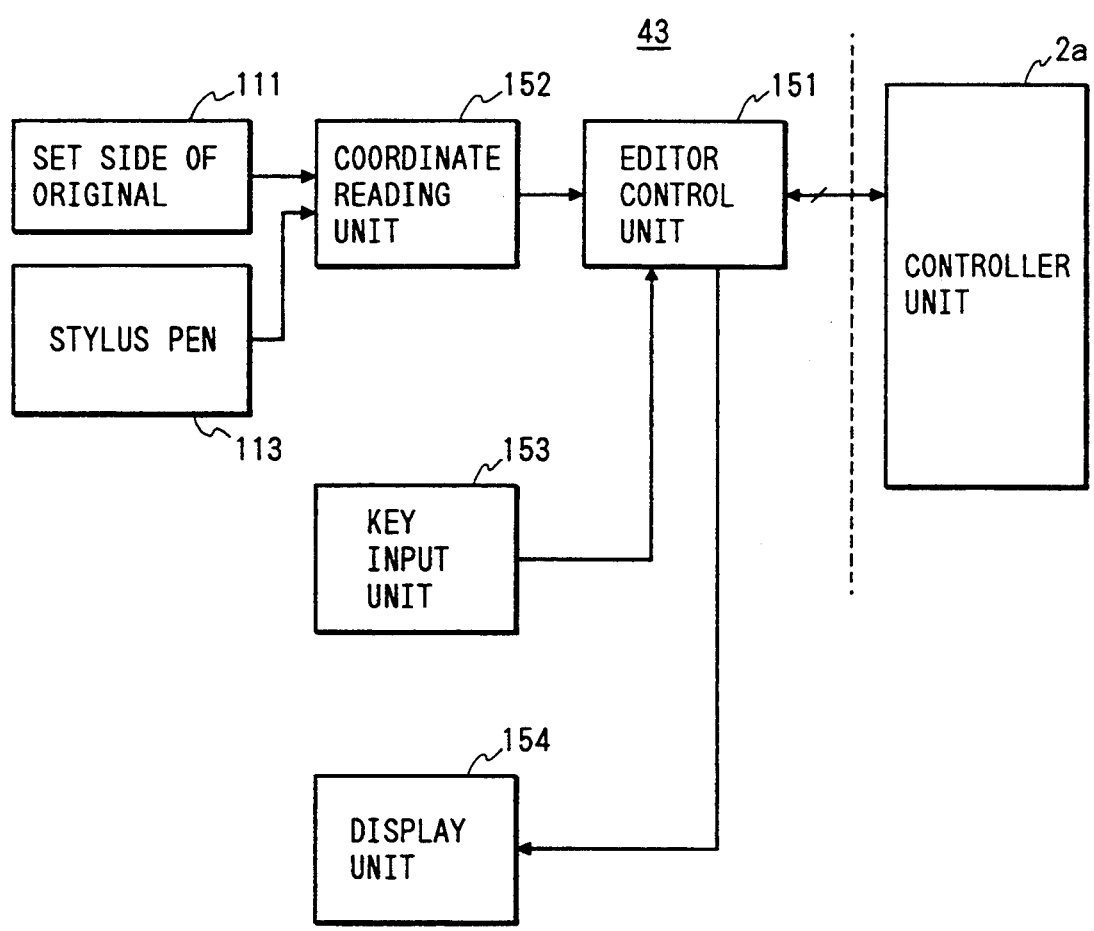
FIG. 10 is a block diagram for explaining a control construction of the editor shown in FIG. 2.

FIG. 10 is a block diagram for explaining a control construction of the editor 43 shown in FIG. 2. The same component elements as those shown in FIG. 9 are designated by the same reference numerals.

In the diagram, reference numeral 151 denotes an editor control unit for analyzing coordinate information which is generated by a coordinate reading unit 152 and a key input unit (various kinds of keys shown in FIG. 9) 153 and for generating the mode, character code, and the like which have been designated and inputted to the controller unit 2a. A display 154 corresponds to the various kinds of displays shown in FIG. 9 and displays the above mode and the like.

Description of the Operation Unit

Figure 11:
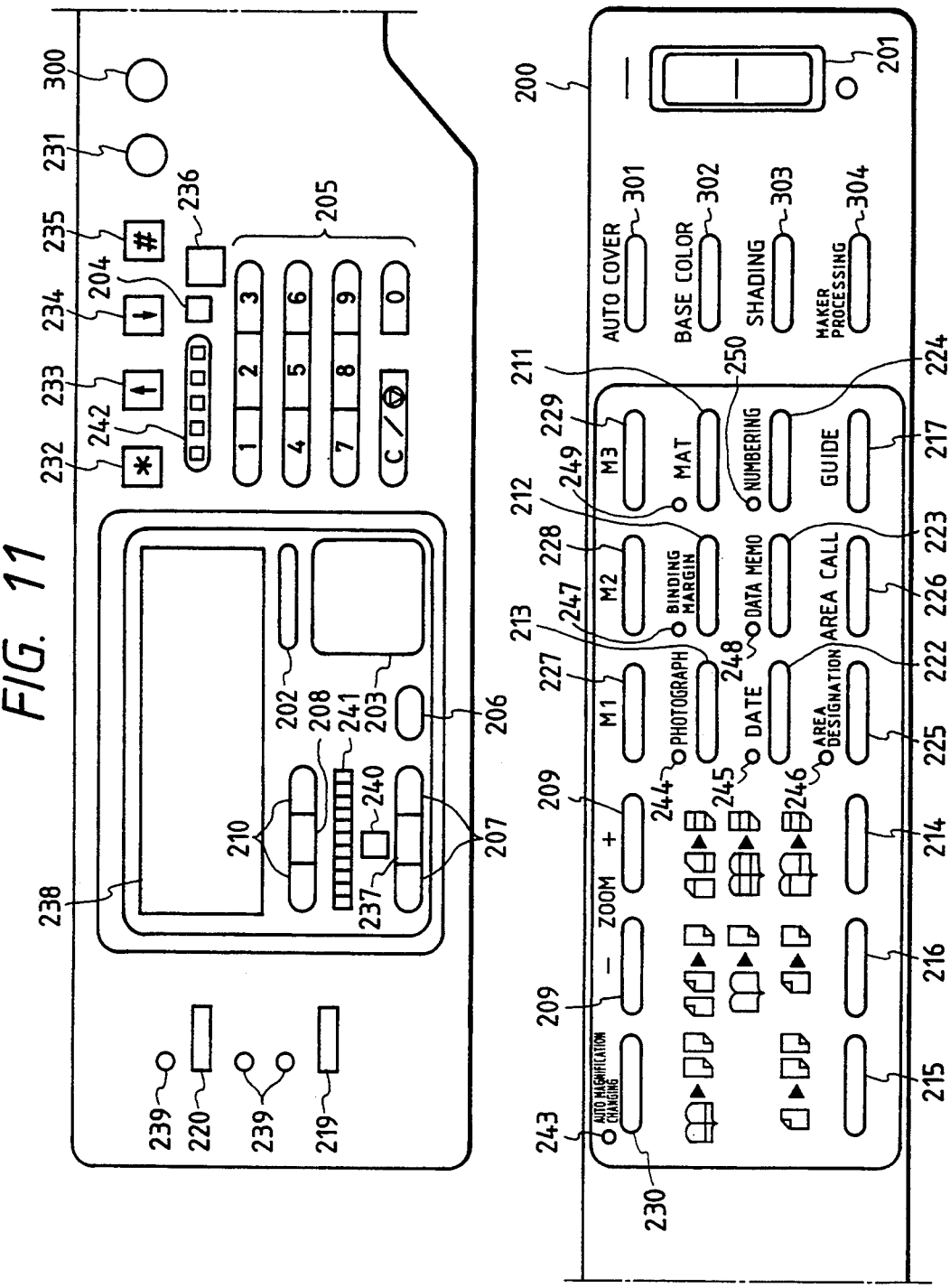
FIG. 11 is a detailed plan view for explaining a construction of an operation unit shown in FIG. 2.

A construction of an operation unit 200 shown in FIG. 11 will now be described.

In the diagram, reference numeral 201 denotes a power switch to control the current supply to the image forming apparatus; 202 a reset key which operates as a key to return the copy mode to a predetermined standard mode in the standby state; 203 a copy key; 204 a developing device switching key for selecting and switching the developing units 13a, 13b, and 13c; 205 a ten-key panel to mainly input the number of image forming sheets; and 236 a personal identification number input mode key. When a previously registered personal identification number is input by the ten-key panel 205 after the key 236 was depressed, the copying operation can be performed and, so long as the personal identification number is not inputted, the copying operation can be inhibited. That is, the copying apparatus can be used by only special operators. Reference numeral 206 denotes a key to select either one of the cassettes 3; 207 a copy density adjusting key; 208 a key to select a real size copy; 209 an zoom key to designate a image forming magnification on a predetermined magnification unit basis, for instance, on a 1% unit basis; 230 an auto magnification changing key to automatically enlarge or reduce the image in accordance with the original size and the size of the copy transfer paper; 210 a fixed magnification key to indicate a fixed reduction magnification or a fixed enlargement magnification; 211 a key to designate the deletion of the frame of the original; 212 a key to designate the formation of a binding margin to an edge region of the copy paper; 213 a key to designate a photograph mode to copy a half tone image such as a photograph original; 225 an area designation key to designate an area; 226 an area call key to correct a part of the content of the area designated by the area designation key 225; 217 a guide key to determine the content of each function; 231 a preheating mode key to set a preheating mode; 214 a multiplexing key to select a multiplex copy mode; 215 a serial copy key to designate a continuous copy mode for dividing the copy area of the original glass base into two right and left regions and for automatically copying two sheets; 216 a key to select a two-sided copy mode; 300 an auto color key which is depressed when the colors of red and blue of the original are recognized and the original image is reproduced by red and blue, respectively; 301 an auto cover key which is depressed, for instance, when a cover paper or a partition paper is inserted to an arbitrary position by a color paper by sandwiching a color paper into the originals which are mounted to the feeder or the like; 302 a base color key which is depressed to add a base color (the background is colored) to the portion on the original which is surrounded by a marker of red or blue; 303 a shading key which is depressed in case of shading the original image (characters or the like); 304 a marker processing key which is depressed to erase the image in or out of the area of the original that is surrounded by the marker and which is also used to select the erasure of the image in the area or the erasure of the image out of the area while looking at the display 138; 219 and 220 keys to designate the operation of the sorter 50b; and 222 to 224 keys to designate a mode to write predetermined character data into the copy image and to designate a mode to write year, month, and day, a mode to write a data memo, a numbering writing mode, and the like, respectively. Reference numerals 227 to 229 denote mode memory keys to store the copy modes which have been copy set. Three kinds of copy modes $M_1$ to $M_3$ are stored. Reference numeral 232 denotes an asterisk key; 233 an up key; 234 a down key; 235 an OK key; 238 a liquid crystal display device to display the number of copy sheets, size of copy transfer paper, set magnification, message, or the like. Reference numerals 239 to 250 denote displays using LEDs (light emitting diodes). The display 239 functions as a using sorter display in case of using the sorter 50b. The display 240 functions as an automatic exposure adjusting display which is lit on when an automatic exposure adjusting (AE) key 237 is depressed and an AE mode is set. The display 241 functions as a density display corresponding to the operation of the copy density adjusting key 207. The display 242 functions as a display in which a color indicator corresponding to the color of a selected developing device is turned on when the color developing device switching key 204 is depressed and a color developing device provided in the main body or a plural developing device enclosing apparatus provided as an option is selected. The display 243 functions as an auto magnification changing display to display the depression of the auto magnification changing key 230. The display 244 functions as a photograph mode display. The display 245 functions as a year/month/day writing mode display. The display 246 functions as an area designation display. The display 247 functions as a binding margin mode display. The display 248 functions as a memory writing mode display. The display 249 functions as a frame erasing mode display. The display 250 functions as a numbering mode display.

Figure 12:
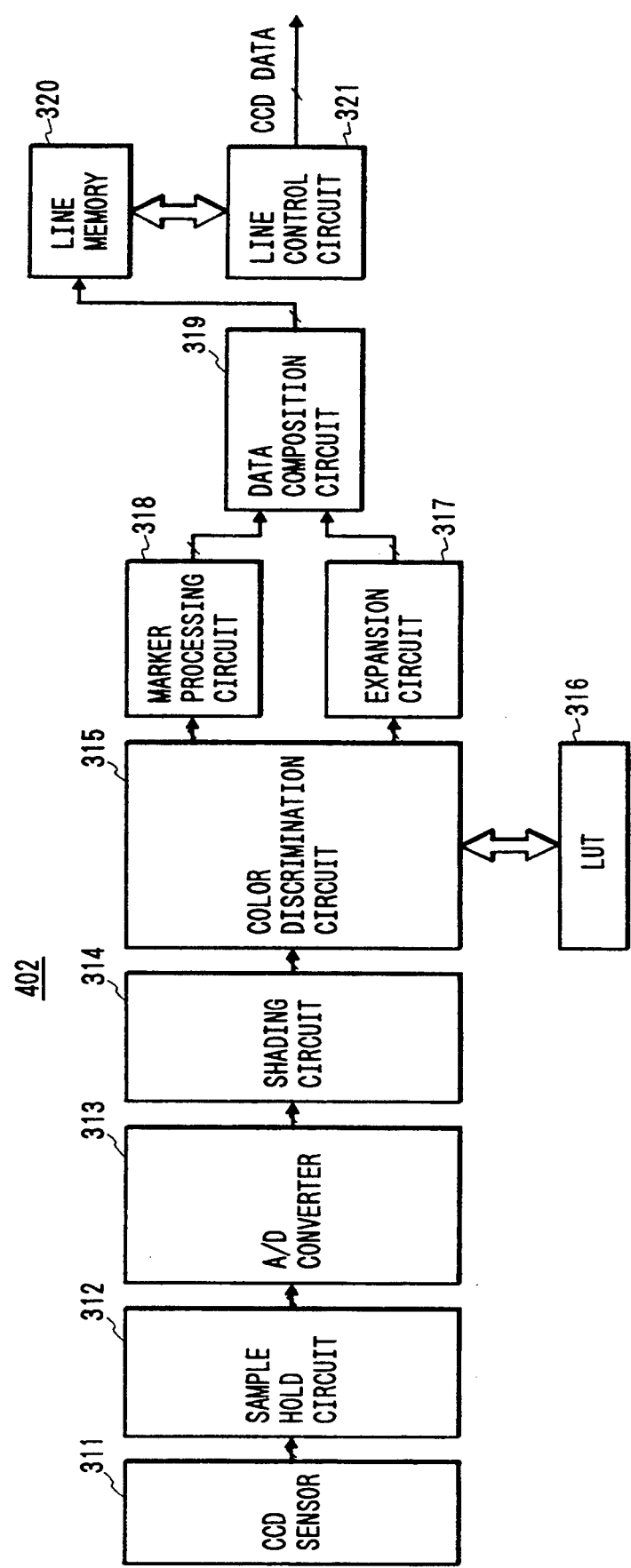
FIG. 12 is a block diagram for explaining a construction of an image processing unit shown in FIG. 2.

FIG. 12 is a block diagram for explaining a construction of the image processing unit 402 shown in FIG. 2. The construction and operation will now be described hereinbelow.

In the case where an original to be copied is a multicolor original, the image processing unit 402 is constructed so that the original image is read by a CCD sensor 311 and color information can be extracted. In the embodiment, blue, red, and black can be detected. Simultaneously with the operations to scan the original put on the original glass base in the direction shown by the arrow (FIG. 1) and to form an electrostatic latent image on the photo sensitive drum 11, the image information of the original is read by the CCD sensor 311. The CCD line sensor 311 has two sensors: a sensor attached with a red filter; and a line sensor attached with a cyan filter. Two continuous analog output signals from the CCD sensor 311 are respectively sampled by a sample hold circuit 312 and converted into digital image signals by an A/D converter 313. After that, a shading correction of the digital image signals is executed by a shading circuit 314. A color discrimination circuit 315 converts two digital signals into color image signals totalling three colors of blue, red, and black by a preset lookup table (LUT) 316. The color image signals of three colors are supplied to a marker processing circuit 318 and an expansion circuit 317. In the case where an area of the original is designated by using a marker pen, the marker processing circuit 318 produces an interval signal of such an area from the color image signal corresponding to the marker color (blue or red). The expansion circuit 317 executes an arbitrary expansion to the color image signal selected by the controller 2. For instance, by executing the expanding process to the color image signal of characters or the like, the color image signal of a form such that the line is made thick is obtained. The expanding operation can be realized by, for example, taking the OR of the pixel data in a window of $3 \times 3$ pixels. The expansion width can be arbitrarily set by changing the window size. Reference numeral 319 denotes a data composition circuit to synthesize the color image signal of the marker processing circuit 318 and the color image signal of the expansion circuit 317. An output signal from the data composition circuit 319 is supplied to a line memory 320. By controlling the read-out timing from the line memory 320 by a line control circuit 321, the position of the analog latent image which is formed on the drum 11 by the scanning exposure and the position of the digital electrostatic latent image which is formed by the exposure of the laser beam are matched on the drum 11. An output signal CCDDATA from the line control circuit 321 is supplied to the CCD data control circuit 105 shown in FIG. 6 and used as an ON/OFF control signal of the laser beam.

An add-on printing process due to the color marker designation in the image forming apparatus according to the invention will now be described hereinbelow with reference to FIGS. 13 to 17 and the like.

Figure 13:
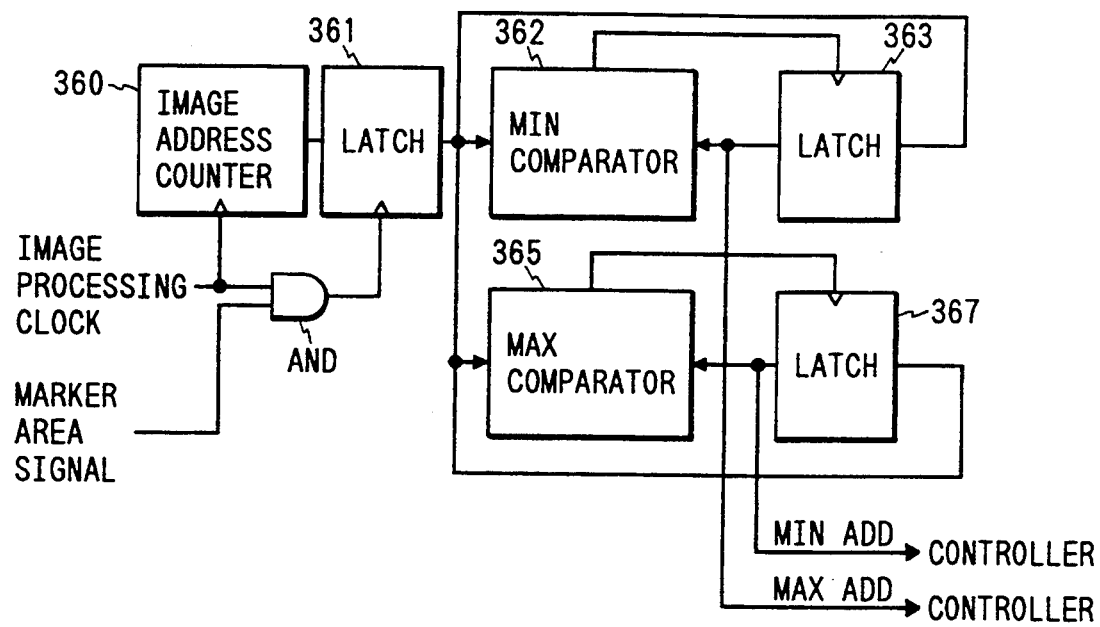
FIG. 13 is a circuit block diagram for explaining a construction of marker area discriminating means in the image forming apparatus according to the invention.

FIG. 13 is a circuit block diagram for explaining a construction of marker area discriminating means in the image forming apparatus according to the invention. Such means is provided in the image processing unit 402 shown in FIG. 2. In the diagram, reference numeral 360 denotes an image address counter. A marker area signal which is generated by the marker processing circuit 318 (FIG. 12) is counted by image processing clocks (pixel unit). A count value indicative of the area width is latched into a latch 361 on the basis of an output of an AND gate AND. A minimum comparator 362 compares the minimum value data which is held in a latch 363 and a value which is held in the latch 361 and generates image position information MINADD as a minimum value to the controller 42. A maximum comparator 365 compares the maximum value data which is held in a latch 367 and a value which is held in the latch 367 and generates image position information MAXADD as a maximum value to the controller 42. The above area discriminating process is individually executed in each of the horizontal synchronizing direction and the original scanning direction.

Figure 14:
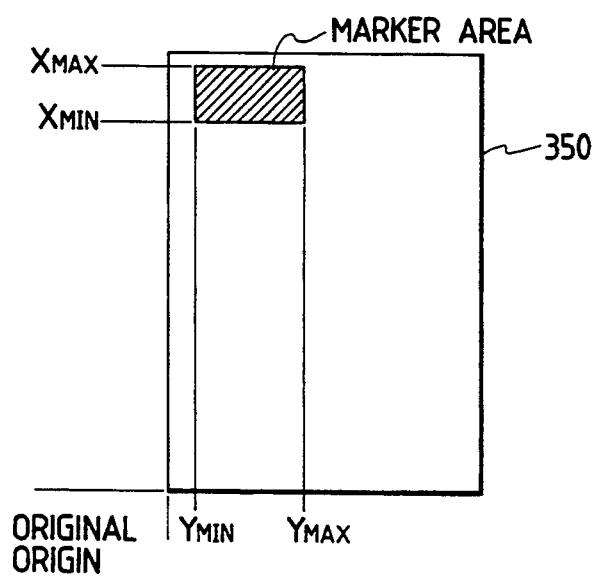
FIG. 14 is a diagram showing an example of a marker area which is written on an original.
Figure 15A:
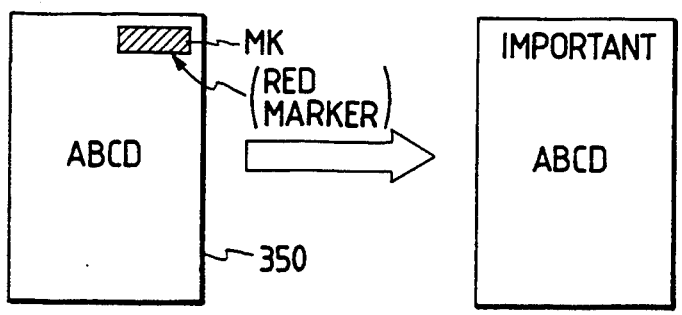
FIGS. 15A ad 15B are schematic diagrams each showing relative relations between a marker area MK written on the original and an output result.
Figure 15B:
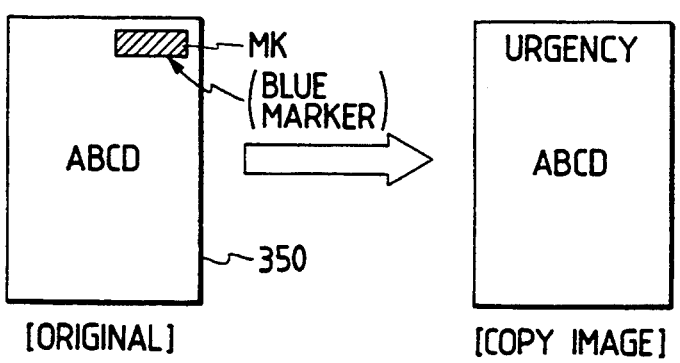

FIG. 14 is a diagram showing an example of a marker area which is written onto the original. MK denotes a marker area (hatched area). The marker area MK is marked by a desired color at a desired position on an original 350. In the diagram, position data $X_{MIN}$ is determined by the image position information MINADD for the horizontal synchronizing direction. Position data $X_{MAX}$ is determined by the image position information MAXADD for the horizontal synchronizing direction. Position data $Y_{MIN}$ is determined by the image position information MINADD for the original scanning direction. The position data $Y_{MAX}$ is determined by the image position information MAXADD for the original scanning direction. The marker area MK is specified by those four position data and the printing position of the designated add-on information and the printing direction are automatically determined.

FIGS. 15A to 17B are diagrams showing relative relations between the marker area MK written on the original and the output result in the stamp mode.

First, the copying conditions such as registration number setting and the like are set by the operation unit 41. The stamp mode is subsequently set by the stamp mode setting key 130 of the editor 43. Further, by depressing the auto key 305, the auto stamp mode by the marker is selected. The conditions of the stamp information 140, output pattern information 306, stamp color information 307, and the like corresponding to the marker color information 307 or the like which has previously been printed on the set side 111 of the original are set by using the stylus pen 113. The marker color on the original is discriminated. The stamp conditions are automatically selected in accordance with the discriminated marker color. Subsequently, the original marked by the marker of a hue different from the color of the image of the original as shown in FIG. 13 is set onto the original glass base and the start key 203 is depressed. Thus, the original scan is started and the reflected image of the original image is formed on the drum 11. In this instance, since the color of the portion of the marker area MK is discriminated by the image processing unit 402, the marker portion is extracted and the erase data CCDDATA is generated so as to erase the area corresponding to the marker portion on the photo sensitive drum. On the basis of the erase data CCDDATA, the laser unit 45 controls the laser radiation, so that the latent image of the marker portion on the drum 11 is erased. The addresses (coordinates) of the marker area MK on the original are recognized by the image processing unit 402. That is, as shown in FIG. 13, the count value of the image address counter 360 is latched into the latch 361 every pixel of the marker area MK and is compared by the comparators 362 and 365. The maximum value (MAX) and the minimum value (MIN) are respectively latched into the latches 367 and 363. By detecting the maximum and minimum values in both of the horizontal synchronizing direction of the image and the line direction (original scanning direction), the image position information MINADD and MAXADD of the marker area MK are supplied to the controller 42. The controller 42 receives the position data ($X_{MAX}$, $X_{MIN}$, $Y_{MAX}$, $Y_{MIN}$) as data in the horizontal synchronizing direction and line direction (original scanning direction) of the image position information MINADD and MAXADD and compares the values of ($X_{MAX}-X_{MIN}$) and ($Y_{MAX}-Y_{MIN}$), thereby setting in which direction for the original the add-on information is printed. Such information is written into the 2-port RAM 83 and set into each control circuit by the laser unit controller 80 and the setting of the next add-on information is completed. The original image is copy transferred to the cut sheet fed during the time interval of the above operations and the cut sheet is again conveyed to the position of the resist roller 12 through the multiplex path. The setting to record the add-on information is now executed. On the basis of the position data ($X_{MAX}$, $X_{MIN}$, $Y_{MAX}$, $Y_{MIN}$) in the X and Y directions of the marker area, the values of ($X_{MAX}-X_{MIN}$) and ($Y_{MAX}-Y_{MIN}$) are compared as mentioned above. The add-on information from the ROM 82 for font is developed and written into the add-on RAM 103 so that the add-on information is directed in the direction of either larger one of those values. With respect to the position at which the add-on information is printed, the position information is written into the add-on RAM 103 so that the add-on information is started by using the positions of the position data $X_{MIN}$ and $Y_{MIN}$ of the marker area MK as references. The marker color is discriminated by the color discriminating circuit 315. On the basis of the discriminated color, the preset add-on information, for instance, characters "IMPORTANT" in case of a red marker or characters "URGENCY" in case of a blue marker are automatically selected. On the other hand, a corresponding output pattern is selected as another mode in a manner such that standard characters are selected for a red marker and mesh characters are selected for blue. Further, in case of a red marker, the add-on information is developed in red. In case of a blue marker, the add-on information is developed in blue. The laser unit 45 irradiates a laser in accordance with the digital information (dot data corresponding to the stamp characters in the embodiment) developed in the add-on RAM 103 and the blank data stored in the RAMs 85 and 86 for blank and forms the latent image of only the digital information onto the drum 11. In this instance, the shutter 27 operates so as to shut off the reflected light from the original. By developing the latent image formed as mentioned above, the add-on information is generated by the kind of add-on, output pattern, and developing color according to the designation of the marker color. For instance, as a kind of add-on information, when the marker area MK of the original 350 is marked in red, "IMPORTANT" is automatically selected as stamp information and recorded (refer to FIG. 15A). When the mark area MK of the original 350 is marked in blue, "URGENCY" is automatically selected as stamp information and recorded (refer to FIG. 15B).

Figure 16A:
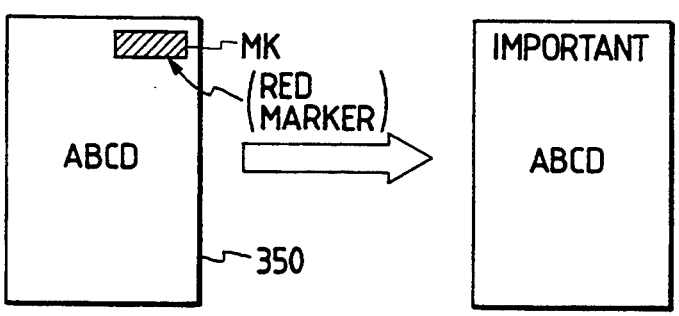
FIGS. 16A and 16B are schematic diagrams showing relative relations between the marker area MK written on the original and an output result.
Figure 16B:
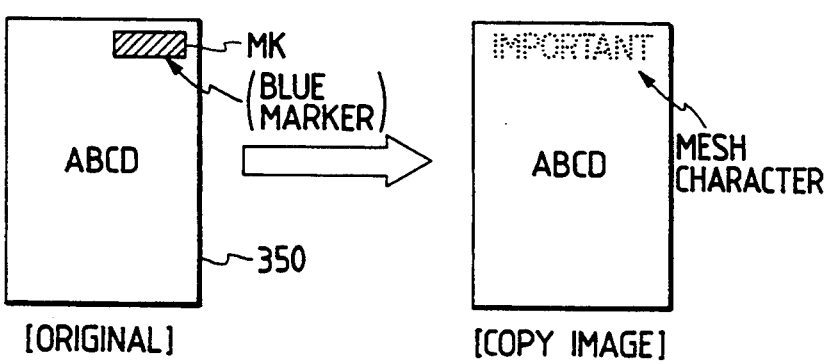

On the other hand, as a kind of output pattern, when the mark area MK of the original 350 is marked in red, the standard output pattern is automatically selected as an output pattern and the corresponding add-on information is recorded in a standard state (refer to FIG. 16A). When the mark area MK of the original 350 is marked in blue, the mesh mode is automatically selected as an output pattern and the correpsonding add-on information is recorded in a meshed state (refer to FIG. 16B).

Figure 17A:
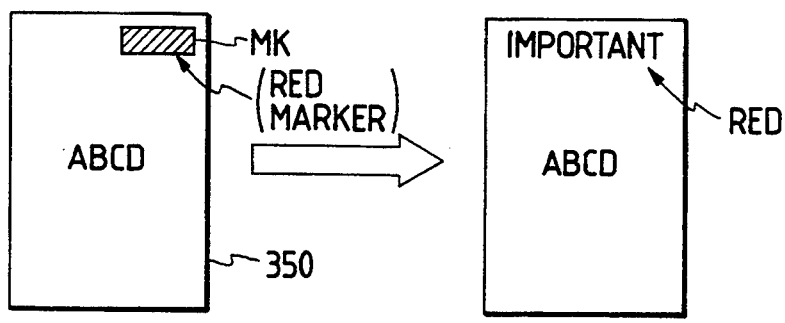
FIGS. 17A and 17B are schematic diagrams showing relative relations between the marker area MK written on the original and an output result.
Figure 17B:
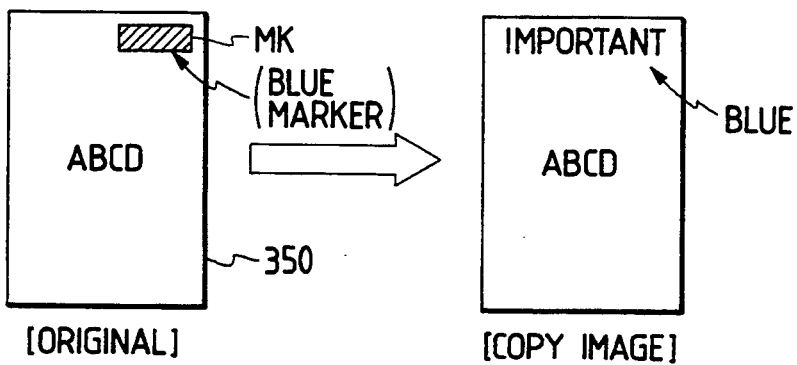

Further, as a developing color, when the mark area MK of the original 350 is marked in red, red is automatically selected as a developing color and the corresponding add-on information is developed in red and recorded (refer to FIG. 17A). When the mark MK of the original 350 is marked in blue, blue is automatically selected as a developing color and the corresponding add-on information is developed in blue and recorded (refer to FIG. 17B).

The registration of the stamp mode according to the marker color will now be described with reference to FIGS. 18A and 18B.

FIGS. 18A and 18B comprises is a flowchart showing a registering process in the stamp mode.

First, the registration switch 309 of the editor unit 110 is depressed to execute a registering process (step 1). A check is made to see if the marker color, the kind of stamp, the kind of output pattern, and the kind of stamp color have been instructed or not by detecting which position of the set side 111 of original of the editor unit 110 has been pointed out by the stylus pen 113 (steps 2, 4, 6, 8). The instructed marker color is discriminated (step 3). The data indicative of the kind of stamp, the kind of output pattern, and the kind of stamp color which have been instructed is temporarily stored into the memory (steps 5, 7, 9). Those kinds can be instructed in accordance with an arbitrary order. A check is again made to see if the registration switch 309 has been depressed or not (step 11). If NO, the processes in step 2 and subsequent steps are repeated so that the above instructions can be changed. If YES, a check is made to see if the kind of marker color has already been instructed or not (step 12). If NO, the processes in step 2 and subsequent steps are repeated in order to specify the marker color. If YES, the data temporarily stored in the memory is stored into the registration area of every marker color in the memory (step 13). The above data is held until the registering process is again performed. When the clear key 141 of the editor unit 110 is depressed during the registering process, the data temporarily stored in the memory is cleared (steps 10, 14). The registering process can be cancelled.

Figure 19:
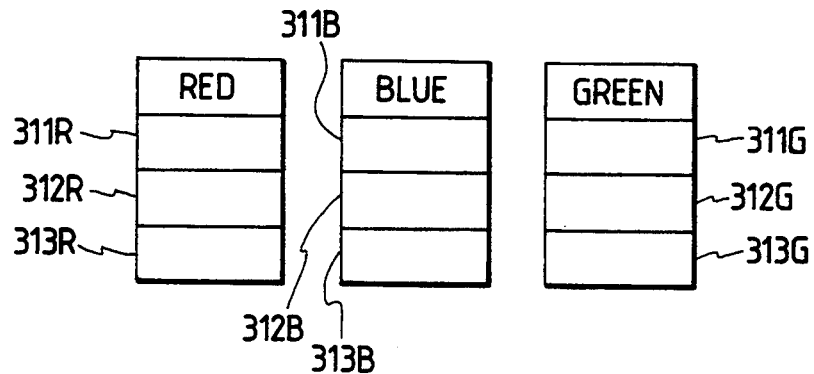
FIG. 19 is a table showing registration areas in the memory to record the processing mode of each marker color.

FIG. 19 shows registration areas in the memory to record the processing mode of each marker color. Reference numerals 311R, 312R, and 313R denote areas to store the kind of stamp, the kind of output pattern, and the kind of stamp color for the red marker. Similarly, reference numerals 311B, 312B, 313B, 311G, 12G, and 313G denote areas to store the data corresponding to the blue marker and the green marker, respectively.

In the registering process, it is not always necessary to instruct as to all of the kind of stamp, the kind of output patterns, and the kind of stamp colors. It is sufficient to construct in a manner such that with respect to the data which is not instructed, the stamp mode is selected and when an image is formed, the operator can instruct such data by the editor unit 110. In FIG. 19, the memory areas of the data which was not instructed have been cleared.

As for the registered processes of every marker color, the data is read out from the memory in FIG. 19 by using the keys of the operation unit 200 and can be displayed on the display 238. The instructed data is also displayed on the display 238 during the registering process.

It is also possible to construct in a manner such that when an image is recorded, a part of the registered processes of every marker color, for instance, the output pattern can be changed by using the editor unit 110. In this instance, the registered data is held as it is without being changed.

The present invention is not limited to the foregoing embodiment but many modifications and variations are possible within the spirit and scope of the appended claims of the invention.

What is claimed is:

24. An image processing apparatus comprising:
 exposing means for exposing an original;
 detecting means for detecting a position and a color of marker information marked by a predetermined color on the original which is exposed by said exposing means;
 storage means for storing a plurality of additional information to be added to the image of said original;
 selection means for selecting the additional information corresponding to the color of marker information detected by said detecting means, from said storage means; and
 determining means for determining a recording position of the additional information [determined]-selected by said selection means in accordance with the position of the marker information which has been detected by the detecting means.

25. An Apparatus according to claim 24, further comprising image forming means for synthesizing the image of the original and the additional information and for recording onto a same recording material,
 and wherein said image forming means records the additional information to said recording position.

4. An image processing apparatus comprising:
 exposing means for exposing an original;
 detecting means for detecting a color of marker information marked by a predetermined color on the original which is exposed by said exposing means; and
 selection means for selecting additional information corresponding to the color of marker information detected by said detecting means, from a plurality of additional information to be added to the image of said original and for selecting a recording condition corresponding to the color of marker information detected by said detecting means, from a plurality of recording conditions.

5. An apparatus according to claim 4, further comprising a memory in which said plurality of additional information have been stored and
 processing means for working and processing the additional information read out from said memory in accordance with the recording condition selected by said selection means.

6. An apparatus according to claim 5, further comprising image forming means for synthesizing the image of the original and the additional information processed by said processing means and for recording onto a same recording medium.

7. An apparatus according to claim 4, wherein said recording condition indicates a recording color of the additional information.

8. An apparatus according to claim 4, wherein said recording condition indicates a working process of the additional information.

9. An image processing apparatus comprising:
exposing means for exposing an original;
detecting means for detecting a position and a color of marker information marked by a predetermined color on the original which is exposed by said exposing means;
selection means for selecting additional information corresponding to the color of marker information detected by said detecting means, from a plurality of additional information to be added to the image of said original;
processing means for performing a processing corresponding to the color of marker information detected by said detecting means, on the additional information selected by said selection means; and
image forming means for recording the original image and the additional information processed by said processing means onto a same recording material,
wherein said image forming means records said processed additional information to a position according to the position of the marker information which has been detected by said detecting means.

10. An image processing mode registering method in an image processing apparatus for processing an image in accordance with marker information marked by a predetermined color on an original, comprising the steps of:
(a) setting a registration mode;
(b) discriminating a color of marker information designated by an operator;
(c) discriminating the kind of the additional information to be added to an original, designated by the operator; and
(d) providing correspondence between the color of marker information discriminated in the step (b) and the kind of additional information discriminated in the step (c) so that the additional information corresponding to the color of marker information detected when an image processing is performed after the registration mode is turned off, can be selected, and
registering the color of marker information and the kind of additional information between which the correspondence is provided.

11. A method according to claim 10, further comprising the steps of:
(e) discriminating a processing mode designated by the operator, and wherein the step (d) provides correspondence between the color of marker information discriminated in the step (b), the kind of additional information discriminated in the step (c) and the processing mode discriminated in the step (e) and registers the color of marker information, the kind of additional information and the processing mode between which the correspondence is provided, in a memory.

12. A method according to claim 11, wherein said processing mode is an image processing mode for the additional information.

13. A method according to claim 11, wherein the step (e) discriminates a recording color of the additional information.

14. A method according to claim 11, wherein the step (e) discriminates the kind of processing of the additional information.

15. A method according to claim 11, wherein said memory stores a plurality of pairs of the color of marker information and the kind of additional information.

16. A method according to claim 10, wherein the step (c) discriminates the kind of-the additional information designated from the plurality of kinds of additional information prestored in additional information storage means.

17. An image processing apparatus comprising:
setting means for setting a registration mode;
first designating means for designating a color of marker information which can be marked onto an original when said registration mode is set;
second designating means for designating a kind of additional information to be added to an image of the original in correspondence to the color of marker information which has been designated by said first designating means when said registration mode is set;
memory means for storing the color of marker information designated by said first designating means and the kind of additional information designated by said second designating means so as to correspond to each other;
detecting means for detecting the color of marker information which has been marked on the original when said registration mode is set; and
control means for reading out the additional information corresponding to the color of marker information which has been detected by said detecting means from said memory means.

18. An apparatus according to claim 17, further comprising third designating means for designating an image processing mode for the additional information designated by said second designating means in correspondence to the color of marker information designated by said first designating means.

19. An apparatus according to claim 17, wherein said memory means stores a plurality of pairs of the color of marker information and the kind of additional information.

20. An apparatus according to claim 17, further comprising display means for displaying the color of marker information and the kind of additional information corresponding thereto, both of which are stored in said memory means.

21. An image processing apparatus, comprising:
exposing means for exposing an original;
detecting means for detecting a color of marker information marked on the original which is exposed by said exposing means;
determination means for automatically determining additional information corresponding to a predetermined color, to be added to the image of the original, when the color of marker information detected by said detecting means is the predetermined color; and
superimposition means for superimposing the additional information determined by said determination means on the image of said original.

22. An apparatus according to claim 21, wherein said determination means selects first additional information when the color of marker information detected by said detecting means is a first color and selects second additional information when the detected color of marker information is a second color.

23. An apparatus according to claim 21, wherein said superimposition means records the additional information and the image of said original on the same side of the same recording paper.

1. An image processing method, comprising the steps of:
 (a) exposing an original;
 (b) detecting a color of marker information marked on the exposed original;
 (c) automatically determining additional information corresponding to a predetermined color, to be added to the image of said original, when the color of marker information detected in the step (b) is the predetermined color; and
 (d) superimposing the additional information determined in the step (c) on the image of said original.

2. A method according to claim 1, wherein the step (c) selects first additional information when the detected color of marker information is a first color, and selects second additional information when the detected color of marker information is a second color.

3. A method according to claim 1, wherein the step (d) records the additional information and the image of said original on the same side of the same recording paper.

* * * * *

UNITED STATES PATENT AND TRADEMARK OFFICE
CERTIFICATE OF CORRECTION

PATENT NO. : 5,436,735

DATED : July 25, 1995

INVENTOR : MASATOSHI TANABE, ET AL.

It is certified that errors appear in the above-identified patent and that said Letters Patent is hereby corrected as shown below:

Title Page,

[75] Inventors:

"Chigasaaki" should read --Chigasaki--.

[57] ABSTRACT -

Line 13, "for synthesizing" should read --then synthesizes--.

COLUMN 2

Line 3, "cross sectional" should read --cross-sectional--;

Line 8, "cross sectional" should read --cross-sectional--;

Line 11, "cross sectional" should read --cross-sectional--;

Line 37, "ad" should read --and--;

Line 42, "and" (second occurrence) should be deleted;

Line 45, "result." should read --result;--;

Line 48, "mode." should read --mode; and--; and

Line 55, "cross sectional" should read --cross-sectional--.

COLUMN 3

Line 4, "photo sensitive" should read --photosensitive--;

Line 12, "photo sensitive" should read --photosensitive--;

UNITED STATES PATENT AND TRADEMARK OFFICE
CERTIFICATE OF CORRECTION

PATENT NO. : 5,436,735

DATED : July 25, 1995

INVENTOR : MASATOSHI TANABE, ET AL.

It is certified that errors appear in the above-identified patent and that said Letters Patent is hereby corrected as shown below:

COLUMN 3, Cont'd.

Line 30, "photo sensitive" should read --photosensitive--;

Line 55, "#or" should read --for--; and

Line 65, "photo sensitive" should read --photosensitive--.

COLUMN 4

Line 51, "unit 02" should read --unit 402--; and

Line 52, "controller 2," should read --controller 42,--.

COLUMN 5

Line 8, "photo sensitive" should read --photosensitive--;

Line 55, "photo" should read --photo- --; and

Line 56, "drums" should read --drum--.

COLUMN 6

Line 34, "is come" should read --comes--; and

Line 48, "ascending" should read --raising--.

COLUMN 8

Line 3, "cross sectional" should read --cross-sectional--; and

Line 21, "roller.57" should read --roller 57--.

UNITED STATES PATENT AND TRADEMARK OFFICE
CERTIFICATE OF CORRECTION

PATENT NO. : 5,436,735

DATED : July 25, 1995

INVENTOR : MASATOSHI TANABE, ET AL.

It is certified that errors appear in the above-identified patent and that said Letters Patent is hereby corrected as shown below:

COLUMN 9

Line 13, "turn-around" should read --reversing--;

Line 22, "the" should be deleted; and

Line 35, "for" should read --to--.

COLUMN 10

Line 7, "0," should read --80,--; and

Line 47, "for" should read --to--.

COLUMN 11

Line 24, "inputting" should read --input--;

Line 35, "inputted;" should read --input;--; and

Line 60, "lit" should read --turned--.

COLUMN 12

Line 12, "(Secret," should read --(SECRET,--;

Line 13, "important, urgency, circulation, don't copy)" should read --IMPORTANT, URGENCY, CIRCULATION, DON'T COPY)--;

Line 38, "inputted" should read --input--;

Line 59, "inputted," should read --input,--.

UNITED STATES PATENT AND TRADEMARK OFFICE
CERTIFICATE OF CORRECTION

PATENT NO. : 5,436,735

DATED : July 25, 1995

INVENTOR : MASATOSHI TANABE, ET AL.

It is certified that errors appear in the above-identified patent and that said Letters Patent is hereby corrected as shown below:

COLUMN 13

Line 53, "lit" should read --turned--.

COLUMN 14

Line 24, "sample hold" should read --sample-hold--.

COLUMN 17

Line 8, "correpsonding" should read --corresponding--;

Line 22, "18A and 18B" should read --18A, 18B, and 19.--;

Line 23, "comprises" should read --comprise--; and

Line 63, "stamp," should read --stamps,--.

COLUMN 18

Line 20, "24." should read --1.--;

Line 34, "[determined]-" should be deleted;

Line 38, "25." should read --2.--; "Apparatus" should read --apparatus--; and "24," should read --1,--;

Line 44, "4." should read --3.--;

Line 58, "5." should read --4.--; and "4," should read --3,--;

Line 60, "stored and" should read --stored; and--; and

UNITED STATES PATENT AND TRADEMARK OFFICE
CERTIFICATE OF CORRECTION

PATENT NO. : 5,436,735

DATED : July 25, 1995

INVENTOR : MASATOSHI TANABE, ET AL.

It is certified that errors appear in the above-identified patent and that said Letters Patent is hereby corrected as shown below:

COLUMN 18, Cont'd.

Line 65, "6." should read --5.--; and "5," should read --4,--.

COLUMN 19

Line 2, "7." should read --6.--; and "4," should read --3,--;

Line 5, "8." should read --7.--; and "4," should read --3,--;

Line 8, "9." should read --8.--;

Line 31, "10." should read --9.--;

Line 53, "11." should read --10.--; and "10," should read --9,--;

Line 65, "12." should read --11.--; and "11," should read --10,--; and

Line 68, "13." should read --12.--; and "11," should read --10,--.

COLUMN 20

Line 3, "14." should read --13.--; and "11," should read --10,--;

Line 6, "15." should read --14.--; and "11," should read --10,--;

UNITED STATES PATENT AND TRADEMARK OFFICE
CERTIFICATE OF CORRECTION

PATENT NO. : 5,436,735

DATED : July 25, 1995

INVENTOR : MASATOSHI TANABE, ET AL.

It is certified that errors appear in the above-identified patent and that said Letters Patent is hereby corrected as shown below:

<u>COLUMN 20, Cont'd.</u>

Line 9, "16." should read --15.--; and "10," should read --9,--;

Line 10, "of-the" should read --of--;

Line 11, "the" should read --a--.

Line 14, "17." should read --16.--;

Line 37, "18." should read --17,--; and "17," should read --16,--;

Line 43, "19." should read --18.--; and "17," should read --16,--;

Line 47, "20." should read --19.--; and "17," should read --16,--;

Line 52, "21." should read --20.--; and

Line 66, "22." should read --21.--.

<u>COLUMN 21</u>

Line 4, "23." should read --22.--; and

Line 8, "1." should read --23.--.

UNITED STATES PATENT AND TRADEMARK OFFICE
CERTIFICATE OF CORRECTION

PATENT NO. : 5,436,735

DATED : July 25, 1995

INVENTOR : MASATOSHI TANABE, ET AL.

It is certified that errors appear in the above-identified patent and that said Letters Patent is hereby corrected as shown below:

<u>COLUMN 22</u>

Line 6, "2." should read --24.--; and "1," should read --23,--; and

Line 11, "3." should read --25.--; and "1," should read --23,--.

Signed and Sealed this

Seventh Day of May, 1996

Attest:

Attesting Officer

BRUCE LEHMAN

Commissioner of Patents and Trademarks